US007243855B2

(12) United States Patent
Matsumoto et al.

(10) Patent No.: US 7,243,855 B2
(45) Date of Patent: Jul. 17, 2007

(54) CONTACTLESS IDENTIFICATION TAG, DATA COMMUNICATION SYSTEM AND CONTACTLESS IDENTIFICATION TAG CONTROL PROGRAM

(75) Inventors: Kenji Matsumoto, Chino (JP); Satoshi Aso, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 316 days.

(21) Appl. No.: 10/996,818

(22) Filed: Nov. 23, 2004

(65) Prior Publication Data

US 2005/0127180 A1 Jun. 16, 2005

(30) Foreign Application Priority Data

Nov. 27, 2003 (JP) ............................. 2003-397351
Mar. 31, 2004 (JP) ............................. 2004-104986

(51) Int. Cl.
*G06K 19/06* (2006.01)
(52) U.S. Cl. ...................... 235/492; 235/451; 235/380; 340/10.2
(58) Field of Classification Search ................ 235/492, 235/451, 487; 340/572.01, 10.2
See application file for complete search history.

(56) References Cited

U.S. PATENT DOCUMENTS

| 5,539,394 | A | * | 7/1996 | Cato et al. ............... 340/10.32 |
| 5,929,779 | A | * | 7/1999 | MacLellan et al. ......... 340/10.2 |
| 7,009,496 | B2 | * | 3/2006 | Arneson et al. ............ 340/10.2 |
| 2002/0175805 | A9 | * | 11/2002 | Armstrong et al. ...... 340/10.31 |
| 2003/0179078 | A1 | * | 9/2003 | Chen et al. ................ 340/10.2 |
| 2004/0160310 | A1 | * | 8/2004 | Chen et al. ................ 340/10.2 |

FOREIGN PATENT DOCUMENTS

| JP | 2814974 | 8/1998 |
| WO | WO 01/57779 A1 | 8/2001 |

* cited by examiner

*Primary Examiner*—Steven S. Paik
(74) *Attorney, Agent, or Firm*—Hogan & Hartson LLP

(57) ABSTRACT

A data communication system includes a host device, a reader/writer device and a plurality of contactless identification tags. The contactless identification tag includes a data reception section, a data transmission section, a data control section, a data storage section, a driving electric current generation section and a coil antenna. In response to a command from the reader/writer device, the data control section generates a random number, and sets a time slot number based on the random number and a unique identification number stored in advance in the data storage section.

18 Claims, 11 Drawing Sheets

CONTACTLESS IDENTIFICATION TAG, DATA COMMUNICATION SYSTEM AND CONTACTLESS IDENTIFICATION TAG CONTROL PROGRAM

BACKGROUND OF THE INVENTION

1. Field of the Invention

The present invention relates to contactless radio data communications that use contactless identification tags and a reader/writer device, and more particularly, to contactless identification tags, data communication systems and contactless identification tag control programs, which are suitable for setting the sequence of communications when a plurality of contactless identification tags are present in the range of communication of a reader/writer device.

2. Description of Related Art

Japanese Patent Document 2814974 describes contactless IC cards and a data communication device, as a data communication technology which sets an appropriate sequence of communications for a reader/writer device and a plurality of RF-ID tags. When the reader/writer device disclosed in Japanese Patent Document 2814974 communicates with a contactless IC card via radio communications, and confirms an interference at an initial communication with the contactless IC card, the reader/writer device sends a notification of the event to multiple contactless IC cards that are present in its range of communication. In the meantime, the contactless IC card generates a random number according to a random number generation algorithm stored in a memory, as a processing preparation at the time of interference, and decides in advance a number (one of 0-9) for a transmission slot (which is a slot divided by time).

After receiving the notification of interference from the reader/writer device, the contactless IC card returns a response to the reader/writer device according to the number of the transmission slot. Further, the contactless IC card sets a number for a transmission slot according to a procedure similar to the above for preparation of the next interference. In the meantime, if the reader/writer device confirms an interference again based on responses from contactless IC cards, the reader/writer device sends a notification of the interference to the contactless IC cards. The processes described above are repeated until there is no interference.

However, according to this conventional technology, random numbers generated by the random number generation algorithm are used as they are (for example, the last digit of each random number is used) for setting numbers for transmission slots, such that the event probability of each of the numbers set to each of the contactless IC cards depends on the event probability of each number generated according to the random number generation algorithm. Therefore, the same number may be set many times to multiple contactless IC cards depending on the performance of the random number generation algorithm. As a result, there are possibilities that interferences may be caused many times, and it may take a long time to cancel the interferences.

The present invention overcomes these unsolved problems of the conventional technology, and provides contactless identification tags, data communication systems and contactless identification tag control programs, which are suitable for setting a sequence of communications where a plurality of contactless identification tags are present in the range of communication of a reader/writer device.

SUMMARY OF THE INVENTION

In one embodiment of the invention, a contactless identification tag is provided that sets a time slot number concerning a sequence of communications with a reader/writer device at the time of data communications with the reader/writer device by a time-division multiplex method using a plurality of time slots, and that is capable of radio communications in a contactless manner with the reader/writer device according to a sequence of communications that is decided based on the time slot number that has been set. The contactless identification tag comprises identification number storage means for storing a unique identification number; random number generator means for generating a random number; and time slot number setting means for setting the time slot number based on the identification number and the random number.

In this embodiment, the identification number storage means can store a unique identification number, the random number generation means can generate a random number, and the time slot number setting means can set a time slot number based on the identification number and the random number. Accordingly, a time slot number is not uniquely decided with a random number generated by the random number generation means, but is decided and set based on a random number and an identification number, such that the time slot number can be set without depending only on the event probability of the random number generation means. Moreover, the identification number may be handled in any form, including without limitation binary numbers, octal numbers, decimal numbers, hexadecimal numbers, etc., and is normally a bit string of binary numbers stored in the identification number storage means.

In another embodiment of the invention, the contactless identification tag is characterized in that the random number and a bit position in a bit string indicating the identification number are correlated with each other in advance, and the time slot number setting means extracts a numerical value at the bit position corresponding to the random number from the bit string indicating the identification number, and sets the time slot number based on the extracted numerical value. In other words, because a time slot number is set based on a numerical value at a bit position corresponding to a random number in a bit string indicating the identification number, a time slot number that does not depend only on the event probability of the random number generation means can be set.

In another embodiment of the invention, the contactless identification tag is characterized in that the bit string indicating the identification number is divided into a plurality of blocks in units of a predetermined number of bits, and a different number is appended to each of the blocks, wherein the time slot number setting means selects one of the blocks corresponding to a random number generated by the random number generation means, and sets the time slot number based on a numerical value composed of a bit string included in the selected block. With such a structure, the time slot number setting means can select one of the blocks assigned with a number corresponding to the random number generated by the random number generation means, and set the time slot number based on a numerical value composed of the bit string included in the selected block.

In this embodiment, a time slot number is not uniquely decided with a random number generated by the random number generation means, but is decided and set based on the random number and the identification number that is divided into blocks, such that a time slot number can be set without depending only on the event probability of the random number generation means.

It is further noted that, in accordance with the present invention, block dividing methods may be enumerated including a method to divide a bit string indicating an identification number into blocks in units of a predetermined numbers of bits in a state in which each of the blocks does not have any bit overlapping with the other blocks; a method to divide it into blocks in units of a predetermined numbers of bits in a state in which each of the blocks does not have any bit overlapping with the other blocks, and adjacent ones of the blocks are spaced from each other by a predetermined number of bits; and a method to divide it into blocks in units of a predetermined numbers of bits in a state in which each of the blocks has bits partially overlapping with the other blocks, and the like If the block division is done in a manner that adjacent ones of the blocks partially overlap one another, as mentioned above, the number of blocks to be divided can be increased, and therefore the probability that time slot numbers become duplicate among a plurality of contactless identification tags can be reduced.

In another embodiment of the invention, the contactless identification tag is characterized in that the time slot number setting means selects a specified bit from the bit string indicating the identification number based on a random number generated by the random number generation means, and sets the time slot number based on a numerical value composed of a bit string of a predetermined number of upper or lower bits with the selected bit as a reference position. With such a structure, the time slot number setting means can select a specified bit from the bit string indicating the identification number based on a random number generated by the random number generation means, and set the time slot number based on a numerical value composed of a bit string of a predetermined number of upper or lower bits with the selected bit as a reference position. Accordingly, a time slot number is not uniquely decided with a random number generated by the random number generation means, but decided and set based on the random number and a bit string with the specified bit in the identification number as a reference, such that a time slot number that does not depend only on the event probability of number generation of the random number generation means can be set.

In another embodiment of the invention, a data communication system is equipped with contactless identification tags as described above, a reader/writer device, and a host device. The reader/writer device, in response to an instruction from a host device, makes the contactless identification tags set the time slot numbers in a manner not to duplicate one another, and radio data communications are performed in a contactless manner between the contactless identification tags and the reader/writer device based on the time slot numbers that have been set.

According to this embodiment, the contactless identification tag does not uniquely decide a time slot number with a random number generated by the random number generation means, but can decide and set a time slot number based on the random number and the identification number, such that a time slot number that does not depend only on the event probability of number generation of the random number generation means can be set, and therefore a time slot number setting process that is difficult to duplicate numbers among a plurality of contactless identification tags can be performed.

In another embodiment of the invention, a data communication system is equipped with contactless identification tags as described above, a reader/writer device, and a host device. The host device comprises first slot number setting instruction means for instructing the reader/writer device to have the plurality of contactless identification tags set the time slot numbers, first tag information obtaining means for obtaining tag information including the identification numbers of the contactless identification tags from the reader/writer device, duplication information obtaining means for obtaining, when duplication information of the time slot numbers is sent from the reader/writer device, the duplication information, and first reset instruction means for giving, when the duplication information is obtained by the duplication information obtaining means, an instruction to reset time slot numbers to the contactless identification tags with the time slot numbers that are duplicated.

According to this embodiment, the reader/writer device comprises second slot number setting instruction means for giving, in response to the instruction to set time slot numbers from the host device, an instruction to set time slot numbers to the plurality of contactless identification tags, second reset instruction means for giving, in response to the instruction to reset time slot numbers from the host device, an instruction to reset time slot numbers to the contactless identification tags with the duplication information detected, second tag information obtaining means for obtaining tag information including the identification numbers of the contactless identification tags from the contactless identification tags, first tag information transmission means for transmitting to the host device the tag information obtained by the second tag information obtaining means, duplicate tag detection means for detecting, based on the tag information obtained by the second tag information obtaining means, whether any of the plurality of contactless identification tags have the time slot numbers that are duplicate, and duplication information transmission means for transmitting to the host device the duplication information when the duplicate tag detection means detects that some of the contactless identification tags have the time slot numbers being duplicate.

Each of the contactless identification tags comprises slot number resetting means for performing, in response to the instruction to set time slot numbers from the reader/writer device, a processing to set the time slot number, and performing, in response to the instruction to reset time slot numbers from the reader/writer device, a processing to reset the time slot number, and second tag information transmission means for transmitting the tag information to the reader/writer device.

With such a structure, the host device can make the first slot number setting instruction means instruct the reader/writer device to have the plurality of contactless identification tags set time slot numbers; can obtain through the first tag information obtaining means tag information including the identification numbers of the contactless identification tags from the reader/writer device; can obtain, through the duplication information obtaining means, when duplication information of the time slot numbers is sent from the reader/writer device, the duplication information; and can give, with the first reset instruction means, when the duplication information is obtained by the duplication information obtaining means, an instruction to reset the time slot numbers to the contactless identification tags with the time slot numbers that are duplicate.

In the meantime, the reader/writer device can give, with the second slot number setting instruction means, in response to the instruction to set time slot numbers from the host device, an instruction to set time slot numbers to the plurality of contactless identification tags; can give, with the second reset instruction means, in response to the instruction to reset time slot numbers from the host device, an instruction to reset time slot numbers to the contactless identification tags with the duplication information detected; and can obtain, with the second tag information obtaining means, tag information including the identification numbers of the contactless identification tags from the contactless identification tags. Also, the reader/writer device can transmit to the host device, with the first tag information transmission means, the tag information obtained by the second tag information obtaining means; can detect, with the duplicate tag detection means, based on the tag information obtained by the second tag information obtaining means, whether any of the plurality of contactless identification tags have the time slot numbers that are duplicate; and can transmit to the host device, with the duplication information transmission means, the duplication information when the duplicate tag detection means detects that some of the contactless identification tags have the time slot numbers being duplicate.

Furthermore, each of the contactless identification tags can perform, with the slot number resetting means, in response to the instruction to set time slot numbers from the reader/writer device, a processing to set the time slot number; can perform, in response to the instruction to reset time slot numbers from the reader/writer device, a processing to reset the time slot number; and can transmit, with the second tag information transmission means, the tag information to the reader/writer device.

Accordingly, the contactless identification tag performs a time slot number setting process that does not depend only on the event probability of number generation of the random number generation means, such that a time slot number setting process that is difficult to duplicate numbers among a plurality of contactless identification tags can be performed. Furthermore, since tag information including the identification numbers of the contactless identification tags is obtained, the contactless identification tags other than those with the duplicate time slot numbers can be excluded from those that are subject to the resetting instruction.

In another embodiment of the invention, the host device is equipped with first operation suspension instruction means for giving an instruction to the contactless identification tags to suspend operations thereof, and first operation restart instruction means for giving an instruction to the contactless identification tags whose operation is suspended by the first operation suspension instruction means to restart the operation. The reader/writer device is equipped with second operation suspension instruction means for giving, in response to the instruction to suspend operations from the host device, an instruction to the contactless identification tags to suspend operations thereof, and second operation restart instruction means for giving, in response to the instruction to restart operations from the host device, an instruction to the contactless identification tags whose operation is suspended to restart the operation thereof. Each of the contactless identification tags stops an operation thereof in response to the instruction to suspend operations from the reader/writer device, and restarts the operation that is suspended in response to the instruction to restart operations from the reader/writer device.

With such a structure, the host device can give, with the first operation suspension instruction means, an instruction to the contactless identification tags to suspend operations thereof, and can give, with the first operation restart instruction means, an instruction to the contactless identification tags whose operation is suspended by the first operation suspension instruction means to restart the operation.

Also, the reader/writer device can give, with the second operation suspension instruction means, in response to the instruction to suspend operations from the host device, an instruction to the contactless identification tags to suspend operations thereof, and can give, with the second operation restart instruction means, in response to the instruction to restart operations from the host device, an instruction to the contactless identification tags whose operation is suspended to restart the operation thereof.

Accordingly, unnecessary communication between the reader/writer device and the contactless identification tags can be prevented, and a condition where time slot numbers are not duplicated among a plurality of contactless identification tags can be quickly established.

In another embodiment of the invention, a data communication system is equipped with contactless identification tags, a reader/writer device, and a host device. The host device comprises first slot number setting instruction means for instructing the reader/writer device to have the plurality of contactless identification tags set the time slot numbers, and first tag information obtaining means for obtaining tag information including the identification numbers of the contactless identification tags from the reader/writer device.

The reader/writer device comprises second slot number setting instruction means for giving, in response to the instruction from the host device, the instruction to set time slot numbers to the plurality of contactless identification tags, second tag information obtaining means for obtaining tag information including the identification numbers of the contactless identification tags from the contactless identification tags, duplicate tag detection means for detecting, based on the tag information obtained by the second tag information obtaining means, whether any of the plurality of contactless identification tags have the time slot numbers that are duplicate, reset instruction means for giving, when the duplicate tag detection means detects that some of the contactless identification tags have the time slot numbers that are duplicate, an instruction to reset time slot numbers to the contactless identification tags, and first tag information transmission means for transmitting to the host device the tag information obtained by the second tag information obtaining means.

Each of the contactless identification tags comprises slot number resetting means for performing, in response to the instruction to set time slot numbers from the reader/writer device, a processing to set the time slot number, and performing, in response to the instruction to reset time slot numbers from the reader/writer device, a processing to reset the time slot number, and second tag information transmission means for transmitting the tag information to the reader/writer device.

With such a structure, the host device can instruct, with the first slot number setting instruction means, the reader/writer device to have the plurality of contactless identification tags set the time slot numbers; and can obtain, with the first tag information obtaining means, tag information including the identification numbers of the contactless identification tags from the reader/writer device.

Meanwhile, the reader/writer device can give, with the second slot number setting instruction means, in response to the instruction from the host device, an instruction to set time slot numbers to the plurality of contactless identification tags; can obtain, with the second tag information obtaining means, tag information including the identification numbers of the contactless identification tags from the contactless identification tags; and can detect, with the duplicate tag detection means, based on the tag information obtained by the second tag information obtaining means, whether any of the plurality of contactless identification tags have the time slot numbers that are duplicate. Also, the reader/writer device can give, with the reset instruction means, when the duplicate tag detection means detects that some of the contactless identification tags have the time slot numbers that are duplicate, an instruction to reset time slot numbers to the contactless identification tags, and can transmit to the host device, with the first tag information transmission means, the tag information obtained by the second tag information obtaining means.

Each of the contactless identification tags can perform, with the slot number resetting means, in response to the instruction to set time slot numbers from the reader/writer device, a processing to set the time slot number; can perform, in response to the instruction to reset time slot numbers from the reader/writer device, a processing to reset the time slot number; and can transmit, with the second tag information transmission means, the tag information to the reader/writer device.

Accordingly, the contactless identification tag performs a time slot number setting process that does not depend only on the event probability of number generation of the random number generation means, such that a time slot number setting process that is difficult to duplicate numbers among a plurality of contactless identification tags can be performed. Furthermore, since tag information including the identification numbers of the contactless identification tags is obtained, the contactless identification tags other than those with the time slot numbers being duplicate can be excluded from those that are subject to the resetting instruction.

Compared with other embodiments of the invention, even if time slot numbers are duplicate, there is no need to transmit information concerning the duplication from the reader/writer device to the host device. Moreover, there is no need to give an instruction to reset time slot numbers from the host device to the reader/writer device. Accordingly, the present invention contributes to shortening the time for communications between the host device and the reader/writer device.

In another embodiment of the invention, the tag information includes information indicating that the time slot numbers are duplicate. With such a structure, for example, a person who designs contactless identification tags can review the random number generation algorithm in contactless identification tags, the method for setting unique identification numbers and the like based on the event history of collisions (high or low frequency of occurrences).

In another embodiment of the invention, the host device is equipped with tag information display means for displaying the tag information obtained from the reader/writer device. With such a structure, the host device can display, with the tag information display means, the tag information obtained from the reader/writer device. Accordingly, an administrator that manages the host device can readily acquire tag information, and can appropriately operate the host device.

In another embodiment of the invention, the reader/writer device is equipped with operation suspension instruction means for giving an instruction to the contactless identification tags to suspend operations thereof, and operation restart instruction means for giving an instruction to the contactless identification tags whose operation is suspended by the operation suspension instruction means to restart the operation thereof, In this embodiment, each of the contactless identification tags stops an operation thereof in response to the instruction to suspend operations from the reader/writer device, and restarts the operation that is suspended in response to the instruction to restart operations from the reader/writer device. The reader/writer device gives, when the duplicate tag detection means detects that some of the contactless identification tags have the time slot numbers that are duplicate, an instruction to the contactless identification tags having the time slot numbers that are not duplicate to have the operation suspension instruction means suspend the operation thereof, and gives, when duplication of the time slot numbers is cancelled by the resetting instruction means, an instruction to the contactless identification tags whose operation is suspended, to have the operation restart instruction means restart the operation.

With such a structure, the reader/writer device can give, with the operation suspension instruction means, an instruction to the contactless identification tags to suspend their operation, and can give, with the operation restart instruction means, an instruction to the contactless identification tags whose operation is suspended by the operation suspension instruction means, to restart their operation. Accordingly, unnecessary communications between the reader/writer device and the contactless identification tags can be prevented, and a condition where time slot numbers are not duplicated among a plurality of contactless identification tags can be quickly established.

In another embodiment of the invention, a contactless identification tag control program is provided that is executable by a computer for controlling the contactless identification tags described above. The program comprises a random number generating step of generating a random number; and a slot number setting step of setting the time slot number based on the identification number stored in the identification number storage means and the random number generated in the random number generating step.

In another embodiment, the contactless identification tag program is characterized in that the random number and a bit position in a bit string indicating the identification number are correlated with each other in advance, and the time slot number setting step includes extracting a numerical value at the bit position corresponding to the random number from the bit string indicating the identification number, and setting the time slot number based on the extracted numerical value.

In another embodiment of the invention, the contactless identification tag program is characterized in that the bit string indicating the identification number is divided into a plurality of blocks in units of a predetermined number of bits, and a different number is appended to each of the blocks. The time slot number setting step includes selecting one of the blocks corresponding to a random number generated by the random number generation step, and setting the time slot number based on a numerical value composed of a bit string included in the selected block.

In another embodiment of the invention, the contactless identification tag program is characterized in that the time slot number setting step includes selecting a specified bit from the bit string indicating the identification number based on a random number generated by the random number generation step, and setting the time slot number based on a numerical value composed of a bit string of a predetermined number of upper or lower bits with the selected bit as a reference position.

In another embodiment of the invention, the contactless identification tag control program is executable by a computer for controlling the contactless identification tag in a data communication system, and is characterized by a slot number resetting step of performing a processing to reset the time slot number in response to an instruction to reset time slot numbers from the reader/writer device.

In another embodiment of the invention, the contactless identification tag control program is characterized by a second tag information transmission step of transmitting tag information to the reader/writer device.

In another embodiment of the invention, the contactless identification tag control program is characterized by a step of stopping an operation in response to an operation suspension instruction from the reader/writer device, and a step of restarting the operation in response to an operation restart instruction from the reader/writer device.

In another embodiment of the invention, a reader/writer device control program that is executable by a computer for controlling a reader/writer device in a data communication system is provided. The program comprises: a step of giving, in response to the instruction to set time slot numbers from the host device, an instruction to set time slot numbers to the plurality of contactless identification tags; a step of giving, in response to the instruction to reset time slot numbers from the host device, an instruction to reset time slot numbers to the plurality of contactless identification tags with the duplication detected; a step of obtaining tag information including the identification numbers of the contactless identification tags from the contactless identification tags; a step of transmitting to the host device the tag information obtained by the second tag information obtaining means; a step of detecting, based on the tag information obtained by the second tag information obtaining means, whether any of the plurality of contactless identification tags have the time slot numbers that are duplicate; and a step of transmitting to the host device the duplication information when the duplicate tag detection means detects that some of the contactless identification tags have the time slot numbers that are duplicate.

In another embodiment of the invention, a reader/writer device control program that is executable by a computer for controlling a reader/writer device in a data communication system is provided. The program comprises a step of giving, in response to the instruction from the host device, an instruction to set time slot numbers to the plurality of contactless identification tags; a step of obtaining tag information including the identification numbers of the contactless identification tags from the contactless identification tags; a step of detecting, based on the tag information obtained by the second tag information obtaining means, whether any of the plurality of contactless identification tags have the time slot numbers that are duplicate; a step of giving, when the duplicate tag detection means detects that some of the contactless identification tags have the time slot numbers that are duplicate, an instruction to reset time slot numbers to the contactless identification tags, and a step of transmitting to the host device the tag information obtained by the second tag information obtaining means.

DETAILED DESCRIPTION OF THE INVENTION

Embodiments of the present invention are described below with reference to the accompanying drawings. FIG. 1 through FIG. 8 are diagrams showing a data communication system in accordance with an embodiment of the present invention.

1 FIRST EMBODIMENT

Figure 1:
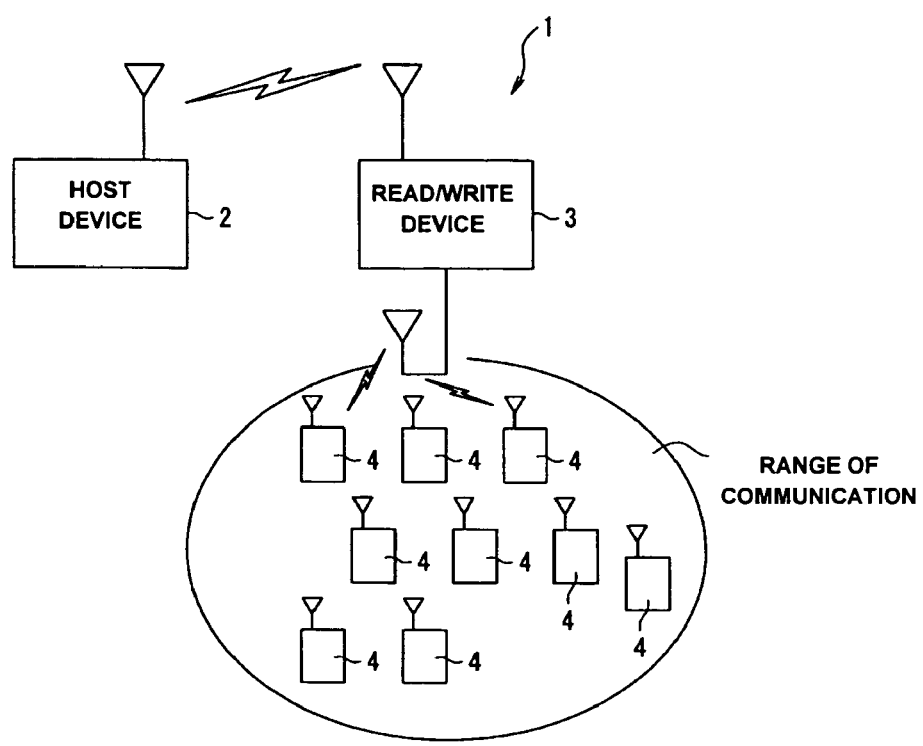
FIG. 1 is a diagram showing the entire composition of a data communication system in accordance with the present invention.

First, the structure of a data communication system in accordance with the present invention is described with reference to FIG. 1. FIG. 1 shows a diagram indicating the overall structure of the data communication system in accordance with the present invention.

The data communication system 1 has a structure including, as shown in FIG. 1, a host device 2, a reader/writer device 3, and a plurality of contactless identification tags 4. The host device 2 has a function to transmit various commands through the reader/writer device 3 to the contactless identification tags 4, and a function to manage various information about the contactless identification tags 4 within the range of communication of the reader/writer device 2. Their detailed structures are described below.

The reader/writer device 3 has a function to perform data communications in a contactless manner between a plurality of contactless identification tags 4 in the range of communication. The reader/writer device 3 sends and receives information to decide time slot numbers between the plural contactless identification tag 4 that exists in the range of communication as a preparation for data communications, and transmits operation suspension commands or operation restart commands to the contactless identification tags 4. In addition, the reader/writer device 3 obtains tag information including a unique identification number of each of the contactless identification tags 4, and transmits the same to the host device 2.

Furthermore, the reader/writer device 3 has a function to detect based on information acquired from the contactless identification tags 4 as to whether duplicate time slot numbers are set at any of the contactless identification tags 4. When this function detects that duplicate time slot numbers are set at some of the contactless identification tags 4, the reader/writer device 3 transmits to those of the contactless identification tags 4 a command to reset the time slot numbers. A detailed structure thereof is described later.

Here, the time slot has information at least on a predetermined time width and a time slot number. The reader/writer device 3 conducts data communications with the contactless identification tags 4 by using slots with numbers corresponding to the sequence of the time slot numbers. However, when duplicate time slot numbers are set at a plurality of contactless identification tags 4, responses are simultaneously returned from the contactless identification tags 4 with the same numbers, wherein a collision of data occurs. In such a state, communications will not be normally conducted between the contactless identification tags 4 with the duplicate numbers and the reader/writer device 3.

The contactless identification tag 4 has a function to conduct data communications in a contactless manner that uses a unique identification number with the reader/writer device 3. Upon receiving a command to set a time slot number from the reader/writer device 3, the contactless identification tag 4 generates a random number, and sets a time slot number based on the random number and a unique identification number. In response to an EOF (End of File) command from the reader/writer device 3, and if the received EOF command corresponds to the time slot number that is set on itself, the contactless identification tag 4 transmits tag information including the identification number. A detailed composition is described later.

Figure 2:
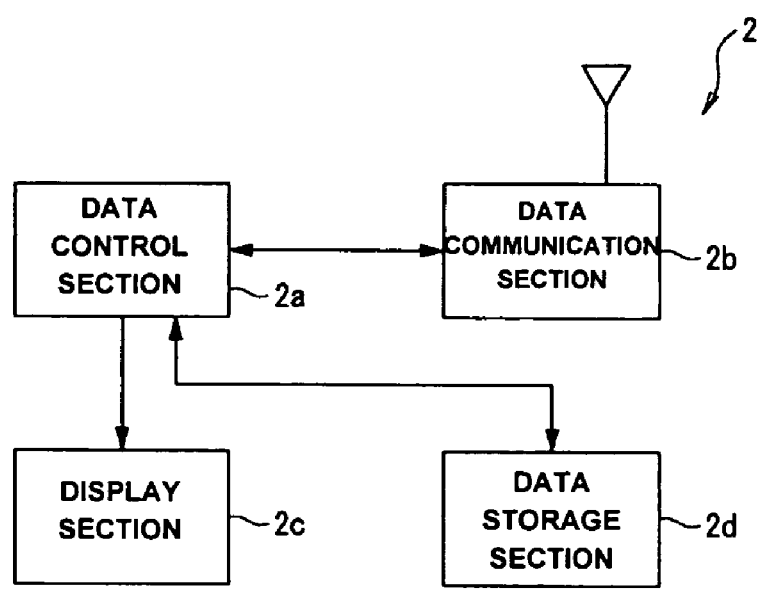
FIG. 2 is a block diagram of a detailed composition of a host device in accordance with the invention.

Referring to FIG. 2, a detailed composition of the host device 2 is described. FIG. 2 is a block diagram of the detailed composition of the host device 2. The host device 2 has a structure including, as shown in FIG. 2, a data control section 2a, a data communication section 2b, a display section 2c, and a data storage section 2d.

The data control section 2a functions to transmit through the data communication section 2b to the reader/writer device 2 various commands such as a command to have the contactless identification tags 4 set time slot numbers, a command to transmit data, and the like, to display tag information obtained from the reader/writer device 3 on the display section 2c, and the like.

The data communication section 2b has a function to conduct radio communications with the reader/writer devices 3, in response to control commands from the data control section 2a.

The display section 2c is equipped with a display unit such as a liquid crystal display, a cathode-ray tube display, etc., and displays information on the contactless identification tags 4 and the like on the display section according to control instructions by the data control section 2a.

The data storage section 2d is a nonvolatile storage medium that stores programs to control the above-described sections, information on the contactless identification tags 4 acquired from the reader/writer device 3, and the like.

Here, the host device 2 is equipped with a CPU that executes control programs corresponding to the respective sections described above, a nonvolatile storage medium that stores the control programs, and a RAM that temporarily stores data necessary at the time of execution of the control programs, although they are not shown in the figures. By executing the control programs corresponding to the respective sections described above by the CPU, the host device 2 controls operations of the respective sections.

Figure 3:
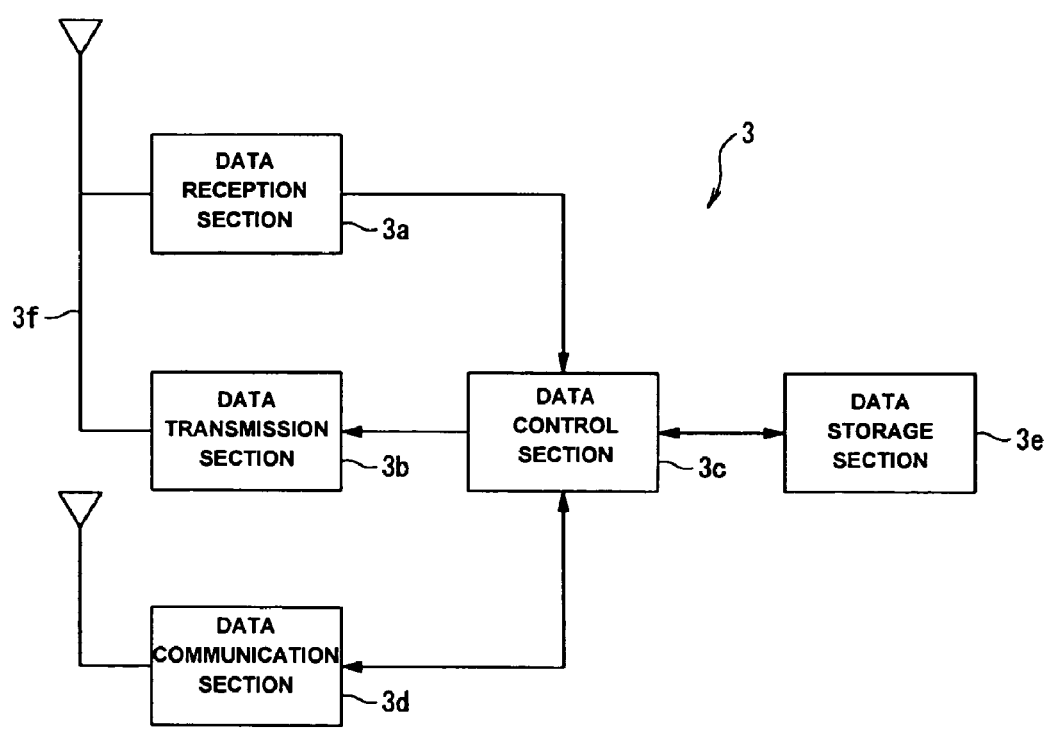
FIG. 3 is block diagram of a detailed composition of a reader/writer device in accordance with the invention.

Furthermore, referring to FIG. 3, a detailed composition of the reader/writer device 3 is described. FIG. 3 is a block diagram indicating the detailed composition of the reader/writer device 3. The reader/writer device 3 has a structure including a data reception section 3a, a data transmission section 3b, a data control section 3c, a data communication section 3d, a data storage section 3e and a coil antenna 3f.

The data reception section 3a has functions to receive electromagnetic waves by an electromagnetic induction method through the coil antenna 3f, demodulate the received electromagnetic waves, separates and extracts data signals from the carrier wave included in the electromagnetic waves.

The data transmission section 3b has functions to modulate various data from the data control section 3c, and transmit the same through the coil antenna 3f, in order to transmit to the contactless identification tags 4 prescribed data stored in the data storage section 3e by an electromagnetic induction method.

The data control section 3c transmits a command to set time slot numbers to decide the communication sequence through data transmission section 3b to a plurality of contactless identification tags 4 in the range of communication, acquire tag information from the contactless identification tags 4, detects based on the tag information acquired as to whether any of the contactless identification tags 4 with duplicate time slot numbers exist, transmits through the data transmission section 3b a command to reset the time slot numbers to those of the contactless identification tags 4 that have the duplicate time slot number, transmits to those of the contactless identification tags 4 where time slot numbers are normally set through the data transmission section 3b a command to suspend operations for the reader/writer device 3, and transmits to those of the contactless identification tags 4 whose operation is suspended through the data transmission section 3b a command to restart the operations.

The data communication section 3d has a function to conduct radio data communications with the host device 3 according to control instructions of the data control section 3c.

The data storage section 3e is a nonvolatile storage medium that stores programs to control the above-described sections, tag information obtained from the contactless identification tags 4, and the like.

It is noted here that, in the present embodiment, a nonvolatile memory, such as, an EEPROM (Electrically Erasable Programmable Read Only Memory), a FeRAM (Ferroelectric Random Access Memory) or the like is used.

The coil antenna 3f is formed from a conductor in a spiral configuration provided on a substrate, and receives electromagnetic waves including data sent by an electromagnetic induction method from the contactless identification tags 4.

The reader/writer device 3 is equipped with a CPU that executes control programs corresponding to the respective sections described above, a nonvolatile storage medium that stores the control programs, and a RAM that temporarily stores data necessary at the time of execution of the control programs, although they are not shown in the figure. The CPU executes the control programs corresponding to the respective sections described above, thereby controlling operations of the respective sections.

Figure 4:
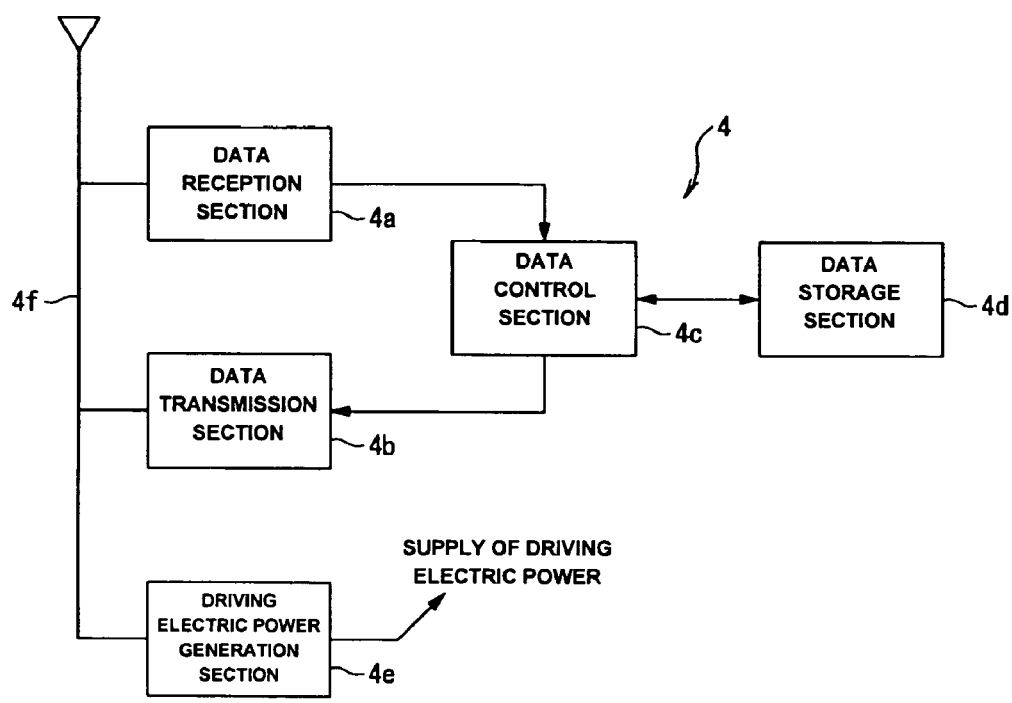
FIG. 4 is a block diagram of a detailed composition of a contactless identification tag in accordance with the invention.

Furthermore, referring to FIG. 4, a detailed composition of the contactless identification tag 4 is described. FIG. 4 is a block diagram of a detailed composition of the contactless identification tag 4. The contactless identification tag 4 has a structure including, as shown in FIG. 4, a data reception section 4a, a data transmission section 4b, a data control section 4c, a data storage section 4d, a driving electric power generation section 4e, and a coil antenna 4f.

The data reception section 4a has functions to receive electromagnetic waves by an electromagnetic induction method through the coil antenna 4f, demodulate the received electromagnetic waves, separates and extracts data signals from the carrier wave included in the electromagnetic waves.

The data transmission section 4b has functions to modulate various data from the data control section 4c, and transmit the same through the coil antenna 4f, in order to transmit to the reader/writer device 3 prescribed data stored in the data storage section 4d by an electromagnetic induction method.

The data control section 4c performs various processings such as to generate a random number in response to a command from the reader/writer device 3, set a time slot number based on the random number and a unique identification number, transmit tag information including the identification number to the reader/writer device 3 through the data transmission section 4b, and suspend its operation and restart the operation suspended in response to commands from the reader/writer device 3.

The data storage section 3d is a nonvolatile storage medium that stores a program to control the above-described sections, unique identification number, time slot number, and the like. It is noted here that, in the present embodiment, a nonvolatile memory, such as, an EEPROM (Electrically Erasable Programmable Read Only Memory), a FeRAM (Ferroelectric Random Access Memory) or the like is used.

The driving electric power generation section 4e generates a driving electric power from electromagnetic waves received from the reader/writer device 3 and supplies the same to the respective sections described above.

The coil antenna 4f is formed from a conductor in a spiral configuration provided on a substrate, and receives electromagnetic waves including data sent by an electromagnetic induction method from the reader/writer device 3.

It is noted here that the contactless identification tag 4 is equipped with, although not shown in the figure, a CPU that executes control programs corresponding to the respective sections described above, and a RAM that temporarily stores data necessary at the time of execution of the control programs. The CPU executes the control programs corresponding to the respective sections described above, thereby controlling operations of the respective sections. It is noted that, although the operations of the contactless identification tag 4 are controlled by the CPU and the control programs in the present embodiment, the operations can be controlled by a logic circuit.

Figure 5:
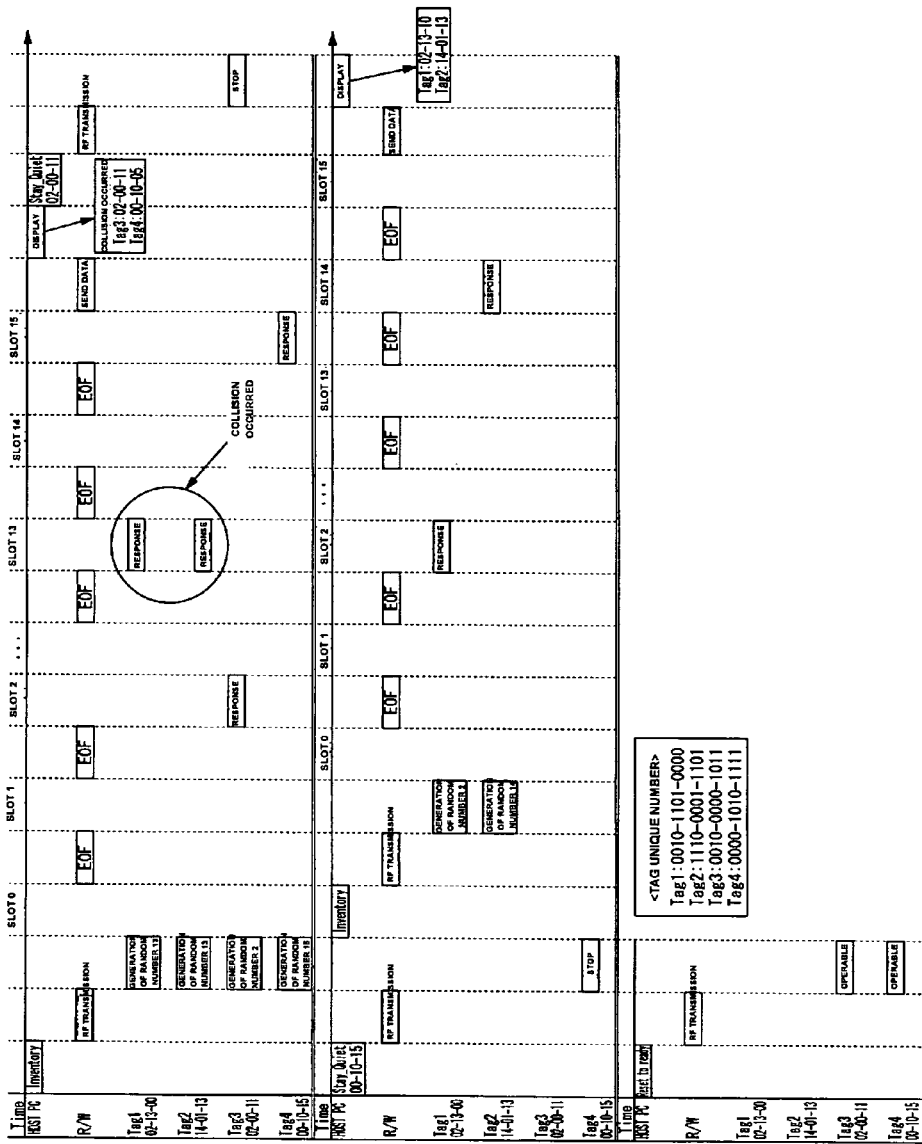
FIG. 5 is a time chart indicating process flows of respective devices at a time of setting time slot numbers in a data communication system in accordance with a first embodiment of the invention.

Next, referring to FIG. 5, more concrete operations of the data communication system 1 are described. FIG. 5 is a time chart indicating process flows of the respective devices at the time of setting time slot numbers in the data communication system 1.

Here, although not particularly shown in the figure, it is assumed that four (first through fourth) contactless identification tags 4A-4D (Tag 1- Tag 4 in FIG. 5, respectively) are present in the range of communication of the reader/writer device 3.

Also, as a unique identification number, "0010-1101-0000" is set in the first contactless identification tag 4A, "1110-0001-1101" is set in the second contactless identification tag 4B, "0010-0000-1011" is set in the third contactless identification tag 4C, and "0000-1010-1111" is set in the fourth contactless identification tag 4D, respectively. Here, the identification number is divided by "-" signs into three blocks, each having a bit string of four digits as one block.

First, the host device 2 transmits to the reader/writer device 3 a command ("Inventory" command indicated in FIG. 5) to have the first-fourth contactless identification tags 4A-4D set time slot numbers. Upon receiving the "Inventory" command, the reader/writer device 3 transmits a command equivalent to the "Inventory" command to set time slot numbers in an analyzable format to the first-fourth contactless identification tags 4A–4D that are present in the range of communication.

When the first-fourth contactless identification tags 4A-4D receive the command to set time slot numbers transmitted from the reader/writer device 3, initially, each of the driving electric power generation sections 4e generates a driving electric power from the carrier wave of the signal received and supplies the same to each of the sections that compose each of the contactless identification tags 4.

When the driving electric power is supplied, the data control section 4c first clears a first time slot counter of its own (not shown) to "0", then generates a random number (here, in a range of numerical values of 0-2), and sets a time slot number based on the random number and the identification number described above.

Here, a random number "1" is generated in the first contactless identification tag 4A, and a time slot number "1101(13)" (here, the numerical value in parentheses is a decimal number) is set based on the random number and the identification number "0010-1101-0000." In other words, random numbers "0", "1" and "2" sequentially correspond from the left to the blocks of the identification number that is divided into three blocks.

Similarly, a random number "2" is generated in the second contactless identification tag 4B, and a time slot number "1101(13)" (here, the numerical value in parentheses is a decimal number) is set based on the random number and the identification number "1110-0001-1101."

Further, a random number "0" is generated in the third contactless identification tag 4C, and a time slot number "0010(2)" (here, the numerical value in parentheses is a decimal number) is set based on the random number and the identification number "0010-0000-1011."

Moreover, a random number "2" is generated in the fourth contactless identification tag 4D, and a time slot number "1111(15)" (here, the numerical value in parentheses is a decimal number) is set based on the random number and the identification number "0000-1010-1111."

Next, after transmitting the command to set time slot numbers, the reader/writer device 3 clears a second time slot counter of its own to "0," and transmits a EOF command to the first-fourth contactless identification tags 4A-4D. Upon receiving the EOF command, each of the first-fourth contactless identification tags 4A-4D compares the value "0" of the first time slot counter with the time slot number that is set on its own. Here, none of the tags is set at the time slot number 0, and therefore the first-fourth contactless identification tags 4A-4D do not return a response, and increment the value at the first time slot counter by one.

When the reader/writer device 3 receives a response or affirms that there is no response during a predetermined time from the contactless identification tags 4, the reader/writer device 3 transmits again an EOF command to the first-fourth contactless identification tags 4A-4D. At this time, each time an EOF is transmitted, the reader/writer device 3 also increments the second time slot counter by one.

In the present embodiment, each time the second time slot counter is incremented by one, an EOF command is transmitted to the first-fourth contactless identification tags 4A-4D until the value of this time slot counter becomes 15.

Here, first, information including the identification number described above is transmitted from the third contactless identification tag 4C as a response, in response to an EOF command corresponding to a value 2 of the first time slot counter.

Then, next, responses are transmitted from the first contactless identification tag 4A and the second contactless identification tag 4B, in response to an EOF command corresponding to a value 13 of the first time slot counters. This means that the same time slot numbers are set at the first contactless identification tag 4A and the second contactless identification tag 4B, and the reader/writer device 3 receives the signal in an abnormal state (for example, in a state in which signal waveforms corresponding to 1 and 0 when Manchester codes are used are overlapped one another), and thus detects a collision state. The reader/writer device 3 memorizes an event of the collision.

Further, a response is transmitted from the fourth contactless identification tag 4D, in response to an EOF command corresponding to a value 15 of the first time slot counter. By this, the processing to send EOF commands corresponding to values 0-15 of the second time slot counter is completed, and the reader/writer device 3 transmits to the host device 2 the information (including the information concerning the collision described above) received from the first-fourth contactless identification tags 4A–4D.

When the information on the first-fourth contactless identification tags 4A-4D in response to the first EOF command is acquired from the reader/writer device 3, the host device 2 displays this information. The operator learns from the displayed information that a collision occurs in the contactless identification tags 4 other than the third and fourth contactless identification tags 4C and 4D in the range of communication. Then, the host device 3 transmits to the reader/writer device 3 a command ("Stay_Quiet" command shown in FIG. 5) that suspends operations, for the third and fourth contactless identification tag 4C and 4D that returned normal responses, in this order.

In the meantime, upon receiving the "Stay_Quiet" command from the host device 2, the reader/writer device 3 transmits an operation suspension command equivalent to the "Stay_Quiet" command in an analyzable format to the third and fourth contactless identification tags 4C an 4D in the same sequence as described above. As a result, the third and fourth contactless identification tags 4C an 4D are placed in a state in which their operations are suspended to commands other than a command to restart the operations from the reader/writer device 3. Here, since the identification numbers of the third and fourth contactless identification tags 4C and 4D are known, such commands can be transmitted individually.

Further, the host device 2 transmits to the reader/writer device 3 a command (here, an "Inventory" command) for the contactless identification tags 4 (here, the first and second contactless identification tags 4A and 4B) with the collision to reset the time slot numbers. Upon receiving the command, the reader/writer device 3 transmits a command for setting time slot numbers to the first-fourth contactless identification tags 4A-4D that are present in the range of communication.

Here, the third and fourth contactless identification tags 4C the 4D, which are in a state in which their operations are suspended by the operation suspension command described above, do not perform the process to set time slot numbers even they receive the command to set time slot numbers.

In the meantime, upon receiving the command to set time slot numbers from the reader/writer device 3, each of the first and second contactless identification tag 4A and 4B clears the first time slot counter to "0," generates a random number (here a range of numerical values of 0-2), and sets a time slot number based on the random number and the above-described identification number. Here, "0010(2)" is set to the first contactless identification tag 4A as a time slot number, and "1110(14)" is set to the second contactless identification tag 4B as a time slot number.

Accordingly, responding to an EOF command corresponding to a value "2" of the time slot counter, a response is transmitted from the first contactless identification tag 4A, and responding to an EOF command corresponding to a value "14" of the first time slot counter, a response is transmitted from the second contactless identification tag 4B, and these responses are received by the reader/writer device 3. After transmitting an EOF command corresponding to a value 15 of the first time slot counter, the reader/writer device 3 transmits tag information acquired from the first and second contactless identification tags 4A and 4B to the host device 2.

By acquiring the tag information obtained from the first and second contactless identification tags 4A and 4B from the reader/writer device 3, the host device 2 learns the identification numbers of the first-fourth contactless identification tags 4A-4D within the range of communication of the reader/writer device 3.

The host device 2, as it acquires tag information of all the contactless identification tags 4 that are present in the range of communication of the reader/writer device 3, transmits to the reader/writer device 3 a command ("Reset to ready" command shown in FIG. 5) for the third and fourth contactless identification tags 4C and 4D in an operation suspended state to restart the operations that are suspended.

Upon receiving the "Reset to ready" command, the reader/writer device 3 transmits a command for restarting operations equivalent to the "Reset to ready" command to the third and fourth contactless identification tags 4C and 4D in an analyzable format. As a result, upon receiving the command for restarting operations, the third and fourth contactless identification tags 4C and 4D restart the operations, respectively, that are suspended.

Accordingly, the host device 2 thereafter becomes capable of transmitting commands or the like to specified ones of the contactless identification tags 4 that are present in the range of communication of the reader/writer device 3, by using the acquired identification numbers.

Further, another method of setting time slot numbers at the contactless identification tags 4 is described. In a similar manner as described above, it is assumed that first-fourth contactless identification tags 4A-4D are present within the range of communication of the reader/writer device 3. Also, as a unique identification number, "001011010000" is set to the first contactless identification tag 4A, "111000011101" to the second contactless identification tag 4B, "001000001011" to the third contactless identification tag 4C, and "000010101111" to the fourth contactless identification tag 4D, respectively.

When a command to set time slot numbers is received from the reader/writer device 3, each of the first-fourth contactless identification tags 4A-4D clears the time slot counter to "0" in a similar manner as described above, and then generates a random number (here, in a range of numerical values of 0-8).

Here, in the first contactless identification tag 4A, when a random number "1" is generated, for example, a second number in the identification number "001011010000" counted from its least bit, in other words, a numerical value that is enclosed by parentheses in "0010110100(0)0" is selected. Then, four bits in the direction of upper bits including this bit are further selected, and set as a time slot number. In other words, four bits in "0010110(1000)0" that are enclosed by parentheses are set as a time slot number "1000(8)" (here, the numerical value in parentheses after the 4 bits is a decimal number).

Similarly, in the second contactless identification tag 4B, when a random number 5 is generated, for example, 4 bits in parentheses in "111(0000)11101" are set as a time slot number "0000(0)." In the third contactless identification tag 4C, when a random number 7 is generated, for example, 4 bits in parentheses in "0(0100)0001011" are set as a time slot number "0100(4)." In the fourth contactless identification tag 4D, when a random number 8 is generated, for example, 4 bits in parentheses in "(0000)10101111" are set as a time slot number "0000(0)." In this case, a collision occurs in the responses from the second contactless identification tag 4B and the fourth contactless identification tag 4D.

Furthermore, another method of setting time slot numbers at the contactless identification tags 4 is described. In a similar manner as described above, it is assumed that first-fourth contactless identification tags 4A-4D are present within the range of communication of the reader/writer device 3. Also, as a unique identification number, "00101101000011" is set to the first contactless identification tag 4A, "11100001110100" to the second contactless identification tag 4B, "00100000101100" to the third contactless identification tag 4C, and "00001010111100" to the fourth contactless identification tag 4D, respectively. Here, the identification number of the first contactless identification tag 4A is divided into three blocks in units of 4 bits with signs "-" at intervals of one bit as "0010-1-1010-0-0011."

Similarly, the identification number of the second contactless identification tag 4B is divided into blocks as "1110-0-0011-1-0100," the identification number of the third contactless identification tag 4C into "0010-0-0001-0-1100," and the identification number of the fourth contactless identification tag 4D into "0000-1-0101-1-1100." Then, random numbers are generated in a range of numerical values of 0-2, and the blocks are sequentially associated from the left to the random numbers "0," "1" and "2." Therefore, when a random number "1" is generated in the first contactless identification tag 4A, 4 bits in parentheses in "0010-1-(1010)-0-0011" are set as a time slot number "1010 (10)" (here, the numerical value in parentheses after the 4 bits is a decimal number).

Similarly, when a random number "0" is generated in the second contactless identification tag 4B, for example, 4 bits in parentheses in "(1110)-0-0011-1-0100" are set as a time slot number "1110(14)." When a random number "2" is generated in the third contactless identification tag 4C, for example, 4 bits in parentheses in "0010-0-0001-0-(1100)" are set as a time slot number "1100(12)." When a random number "0" is generated in the fourth contactless identification tag 4D, for example, 4 bits in parentheses in "(0000)-1-0101-1-1100" are set as a time slot number "0000(0)." In this case, since the time slot numbers are not duplicate, and no collision occurs, the process to reset time slot numbers does not take place.

Another method of setting time slot numbers at the contactless identification tags 4 is described. In a similar manner as described above, it is assumed that first-fourth contactless identification tags 4A-4D are present within the range of communication of the reader/writer device 3. Also, as a unique identification number, "00101101000011" is set to the first contactless identification tag 4A, "11100001110100" to the second contactless identification tag 4B, "00100000101100" to the third contactless identification tag 4C, and "00001010111100" to the fourth contactless identification tag 4D, respectively.

Here, the identification number of the first contactless identification tag 4A is divided into six blocks in units of 4 bits with "–" signs while duplicating two bits on the lower side of each block on the side of upper bits as indicated in parentheses as "0010-(10)11-(11)01-(01)00-(00)00-(00)11." Similarly, the identification number of the second contactless identification tag 4B is divided into blocks as "1110-1000-0001-0111-1101-0100," the identification number of the third contactless identification tag 4C into "0010-1000-0000-0010-1011-1100," and the identification number of the fourth contactless identification tag 4D into "0000-0010-1010-1011-1111-1100."

Then, random numbers in a range of numerical values of 0-5 are set, and the blocks are sequentially associated from the left to random numbers "0," "1," "2," "3," "4" and "5." Accordingly, when a random number "1" is generated in the first contactless identification tag 4A, 4 bits in parentheses in "0010-(1011)-1101-0100-0000-0011" are set as a time slot number "1011(11)" (here, the numerical value in parentheses after 4 bits is a decimal number).

Similarly, for example, when a random number 0 is generated in the second contactless identification tag 4B, 4 bits in parentheses in "(1110)-1000-0001-0111-1101-0100" are set as a time slot number "1110(14)." For example, when a random number 2 is generated in the third contactless identification tag 4C, 4 bits in parentheses in "0010-1000-(0000)-0010-1011-1100" are set as a time slot number "0000(0)." For example, when a random number 4 is generated in the fourth contactless identification tag 4D, 4 bits in parentheses in "0000-0010-1010-1011-(1111)-1100" are set as a time slot number "1111(15)." In this case, since the time slot numbers are not duplicate, and no collision occurs, the process to reset time slot numbers does not take place.

Moreover, in accordance with the present embodiment, an application filed identifier (AFI) information may be included in each command given by the host device 2 and the reader/writer device 3, and further the contactless identification tag 4 may also be provided with AFI information.

Upon receiving the command to set time slot numbers described above, the contactless identification tag 4 may compare the AFI information included in this command with the AFI information of its own, and it is possible to perform the time slot number setting process on the contactless identification tag 4 only when they match each other.

As a result, even when contactless identification tags 4 that have plural different AFI information exist in the range of communication of the reader/writer device 3, communications only with those of the contactless identification tags 4 that have specific AFI information (for example, hospital, traffic, etc.) become possible.

Figure 6:
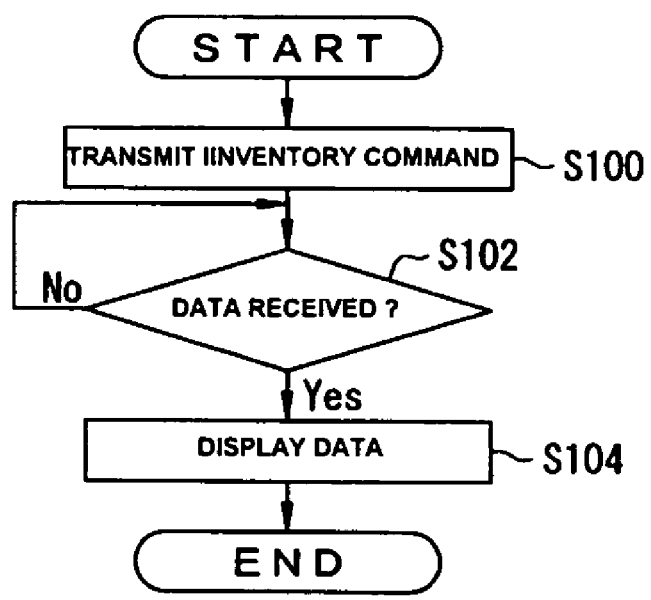
FIG. 6 is a flow chart that shows operation processing of a host device that takes place when a time slot number setting process and a tag information transmission process are performed in accordance with a first embodiment of the invention.

Further, referring to FIG. 6, the flow of operation processing of the host device 2, which takes place when the time slot number setting process and the tag information transmission process are performed, is described. FIG. 6 is a flow chart that shows the operation processing of the host device 2 which takes place when the time slot number setting process and the tag information transmission process are performed.

As shown in FIG. 6, first, the process proceeds to step S100, where the above-described "Inventory" command is transmitted to the reader/writer device 3 from the data control section 2*a* and the data communication section 2*b*, and the process proceeds to step S102. Here, the AFI information is appended to the "Inventory" command.

In step S102, whether the data control section 2*a* has received tag information including collision information from the reader/writer device 3 is judged. If it is judged to have been received (Yes), the process proceeds to step S104, and if not (No), the process stands by until it is received. When the process proceeds to step S104, the received tag information is displayed with the data control section 2*a* and the display section 2*c*, and the process ends.

Figure 7:
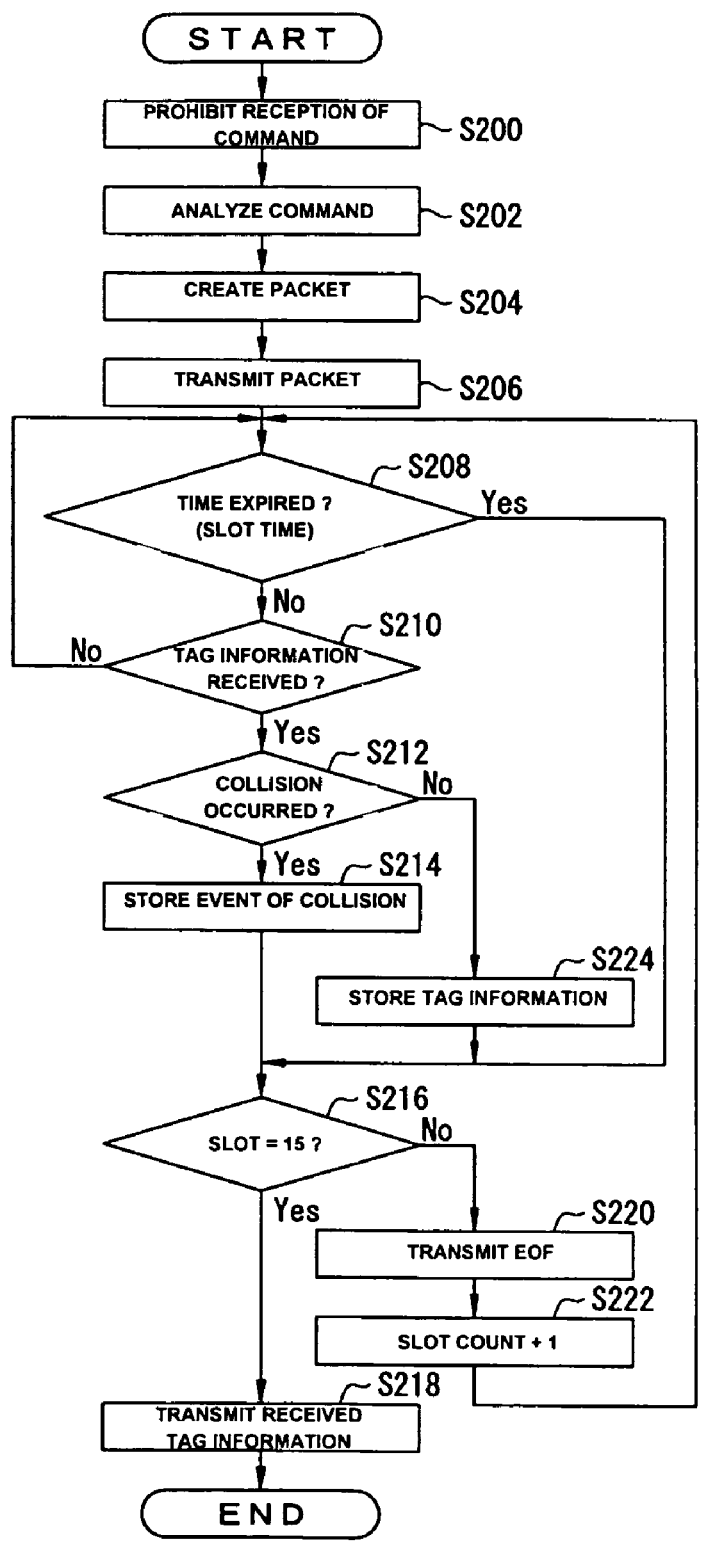
FIG. 7 is a flow chart that shows operation processing of a reader/writer device that takes place when a time slot number setting process and a tag information transmission process are performed in accordance with a first embodiment of the invention.

Further, referring to FIG. 7, the flow of operation processing of the reader/writer device 3, which takes place when the time slot number setting process and the tag information transmission process are performed, is described. FIG. 7 is a flow chart indicating the operation processing of the reader/writer device 3 which takes place when the time slot number setting process and the tag information transmission process are performed. Here, the present flow chart begins with the processing after the "Inventory" command is received from the host device 2.

As shown in FIG. 7, first, the process proceeds to step S200, where the data control section 3*c* prohibits reception of commands from the host device 2, and the process proceeds to step S202. In other words, before the processing of the "Inventory" command ends, the process causes a state in which other commands are not received from the host device 2. In step S202, the received "Inventory" command is analyzed by the data control section 3*c*, and the process proceeds to step S204. In this analysis processing, AFI information and the like included in the "Inventory" command are extracted.

In step S204, the data control section 3*c* generates a packet including a command (including AFI information) equivalent to the above-described "Inventory" command, which can be analyzed by the contactless identification tags 4, and the process proceeds to step S206. In the present embodiment, a packet that includes the actual "Inventory" command is created. In step S206, the generated packet described above is transmitted to the contactless identification tags 4 within the range of communication by the data control section 3*c* and the data transmission section 3*b*, and the process proceeds to step S208.

In step S208, the data control section 3*c* judges whether a predetermined time has passed since the above-described packet was transmitted and became expired, and the process proceeds to step S216 when it is judged that the predetermined time has expired (Yes), and proceeds to step S210 if not (No). When the process proceeds to step S210, the data control unit 3*c* judges whether the tag information has been received from the contactless identification tags 4, and the process proceeds to step S212 if it is judged to have been received (Yes), and proceeds to step S208 if not (No).

When the process proceeds to step S212, the data control section 3*c* judges based on the received tag information as to whether a collision occurred, and the process proceeds to step S214 if it is judged that a collision occurred (Yes), and proceeds to step S224 if not (No). When the process proceeds to step S214, the data control section 3*c* stores an event of the collision in the data storage section 3*e*, and the process proceeds to step S216.

In step S216, the data control section 3*c* judges whether the value of the second time slot counter became 15, and the process proceeds to step S218 when it is judged that the value became 15 (Yes), and proceeds to step S220 if not (No). When the process proceeds to step S218, the received tag information is sent to the host device 2 by the data control section 3*c* and the data transmission section 3*b*, and the process ends.

In the meantime, when the process proceeds to step S220, an EOF command is transmitted to the contactless identification tags 4 within the range of communication by the data control section 3*c* and the data transmission section 3*b*, and the process proceeds to step S222. In step S222, the data control section 3*c* increments the value of the second time slot counter by one, and the process proceeds to step S208.

Figure 8:
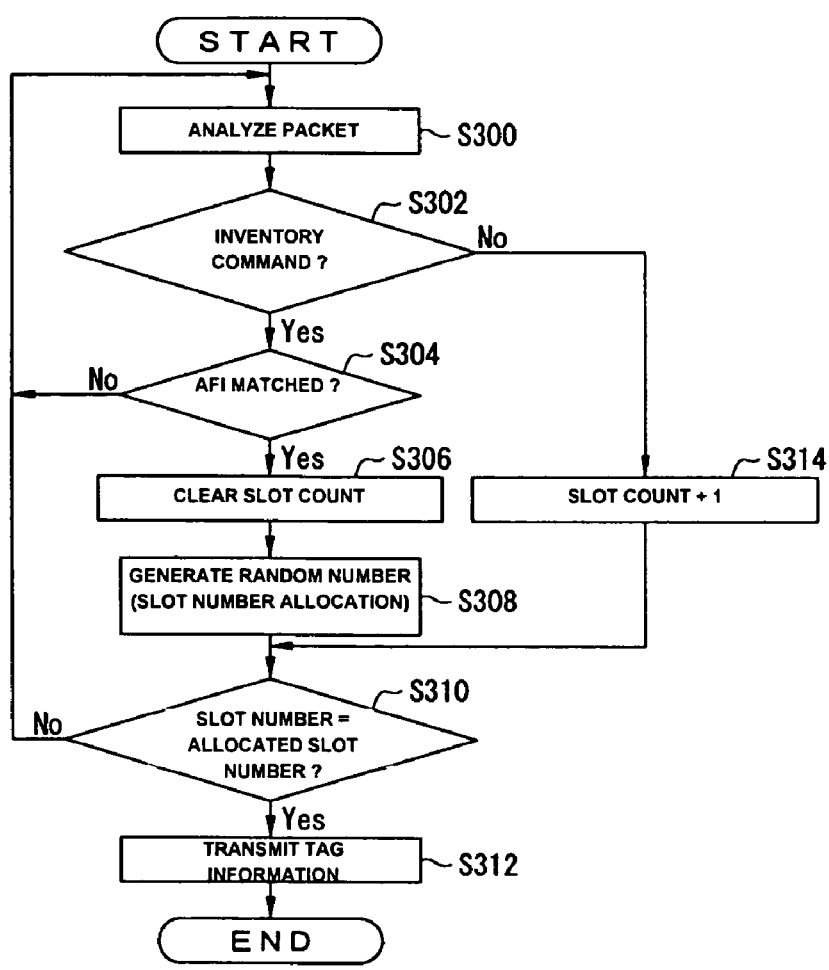
FIG. 8 is a flow chart that shows operation processing of a contactless identification tag that takes place when a time slot number setting process and a tag information transmission process are performed in accordance with first and second embodiments of the invention.

When the process proceeds to step S224, the data storage section 3*e* stores the above-described tag information received in the data control section 3*c*, and the process proceeds to step S216. Next, referring to FIG. 8, the flow of operation processing of the contactless identification tag 4, which takes place when the time slot number setting process and the tag information transmission process are performed, is described. FIG. 8 is a flow chart indicating the operation processing of the contactless identification tag 4, which takes place when the time slot number setting process and the tag information transmission process are performed. Here, the present flow chart begins with the processing after the driving electric power generation section 4*e* generates a driving electric power and supplies the driving electric power to each of the sections.

As shown in FIG. 8, the process first proceeds to step S300, where the data control unit 4*c* analyzes the packet received from the reader/writer device 3, and then proceeds to step S302. In step S302, the data control section 4*c* judges from the analysis result as to whether the packet received is the "Inventory" command, and the process proceeds to step S304 when it is judged to be the "Inventory" command (Yes), and proceeds to step S314 if not (No).

When the process proceeds to step S304, the data control section 4*c* compares the AFI information contained in the above-described packet and the AFI information stored in the data storage section 4*d*, and judges whether they match each other. The process proceeds to step S306 if they are judged to match (Yes), and proceeds to step S300 if not (No). When the process proceeds to step S306, the data control section 4*c* clears the first time slot counter to 0, and then proceeds to step S308.

In step S308, the data control section 4*c* generates a random number, and sets a time slot number based on the random number and the unique identification number stored in the data storage section 4*d*, and the process proceeds to step S310. In step S310, the data control section 4*c* judges whether the command received from the reader/writer device 3 is an EOF command, and whether the time slot number included in the EOF command and the time slot number set match. The process proceeds to step S312 when it is judged to match (Yes), and proceeds to step S300 if not (No).

When the process proceeds to step S312, tag information is transmitted to the reader/writer device 3 by the data control section 4c and the data transmission section 4b, and the process ends.

As a result, at the contactless identification tag 4, the unique identification number is divided into blocks in units of 4 bits, a random number is generated, a specific block among the divided blocks of the unique identification number is selected according to the random number, and a bit string included in the selected one block can be set as a time slot number. Also, at the contactless identification tag 4, a random number is generated, 4 bits are selected among the unique identification number with one bit therein specified by the random number being as a reference, and the 4 bits can be set as a time slot number.

Also, an operation suspension command can be transmitted to those of the contactless identification tags 4 that have normally returned the response, and their operations can be suspended. Also, an operation restart command can be transmitted to those of the contactless identification tags 4 whose operations are suspended, and the operations in suspension can be restarted.

Here, referring to FIG. 2, the processing to transmit the "Inventory" command to the reader/writer device 3 by the data control section 2a and the data communication section 2b corresponds to the first slot number setting instruction means of Invention 6, and the processing to receive tag information (including information on the collision) by the data control section 2a and the data communication section 2b corresponds to the first tag information obtaining means and the duplication information obtaining means of Invention 6. Also, the processing to display the tag information with the data control section 2a and the display section 2c corresponds to the tag information display means of Invention 10, and the processing to transmit the "Inventory" command repeatedly in order to reset the time slot number by the data control section 2a and the data communication section 2b to the reader/writer device 3 corresponds to the first reset instruction means of Invention 6.

Also, referring to FIG. 3, the processing to transmit a command equivalent to the "Inventory" command to the contactless identification tags 4 by the data control section 3c and the data transmission section 3b corresponds to the second slot number setting instruction means of Invention 6, and the processing by the data control section 3c to detect the presence of contactless identification tags that have duplicate slot numbers corresponds to the duplication tag detection means of Invention 6. Furthermore, the processing to transmit a command equivalent to the "Inventory" command to the contactless identification tags 4 repeated by the data control section 3c and the data transmission section 3b after detecting the contactless identification tags 4 that have duplicate time slot numbers corresponds to the second reset instruction means of Invention 6, and the processing to acquire tag information by the data control section 3c and the data reception section 3a corresponds to the second tag information obtaining means of Invention 6. Also, the processing to transmit tag information (including information on the collision) to the host device 2 by the data control section 3c and the data communication section 3d corresponds to the first tag information transmission means and the duplication information transmission means of Invention 6, and the processing to transmit the operation suspension command by the data control section 3c and the data transmission section 3b to the contactless identification tags 4 corresponds to the second operation suspension instruction means of Invention 7. The processing to transmit an operation restart command by the data control section 3c and the data transmission section 3b to the contactless identification tags 4 corresponds to the second operation restart instruction means of Invention 7.

Moreover, referring to FIG. 4, the processing to generate a random number by the data control section 4c corresponds to the random number generation means of any one of Inventions 1-6, the processing to set a time slot number by the data control section 4c corresponds to the time slot number setting means of any of Inventions 1-4, the processing to set a time slot number by the data control unit 4c for a command equivalent to the "Inventory" command repeated from the reader/writer device 3 corresponds to the slot number resetting means of Invention 6, and the processing to transmit tag information to the reader/writer device 3 by the data control section 4c and the data transmission section 4b corresponds to the second tag information transmission means of Invention 6.

In the above-described embodiments, one specific block is selected from among an identification number that is divided into blocks each having 4 bits based on a generated random number and the unique identification number to thereby set a time slot number, or 4 bits are selected from among an identification number with one specific bit therein as a reference to thereby set a time slot number. However, without being limited to these embodiments, time slot numbers can be set by using other methods without departing from the subject matter of the present invention.

Also, in the embodiments described above, the host device 2 transmits an "Inventory" command for resetting time slot numbers, a "Stay_Quiet" command for suspending the operation, and a "Reset to ready" command for restarting the operation in suspension to the reader/writer device 3, thereby having the contactless identification tag 4 perform the time slot number reset processing, the operation suspension processing and the operation restart processing, respectively. Without being limited to those describe above, another structure can be used in which the processings to transmit an "Inventory" command after occurrence of a collision, a "Stay_Quiet" command and a "Reset to ready" command to the contactless identification tags 4, at the time of obtaining tag information, are performed only by the reader/writer device 3. This structure is described in greater detail with reference to FIGS. 1-4, FIG. 8, and FIGS. 9-11.

2 SECOND EMBODIMENT

Figure 9:
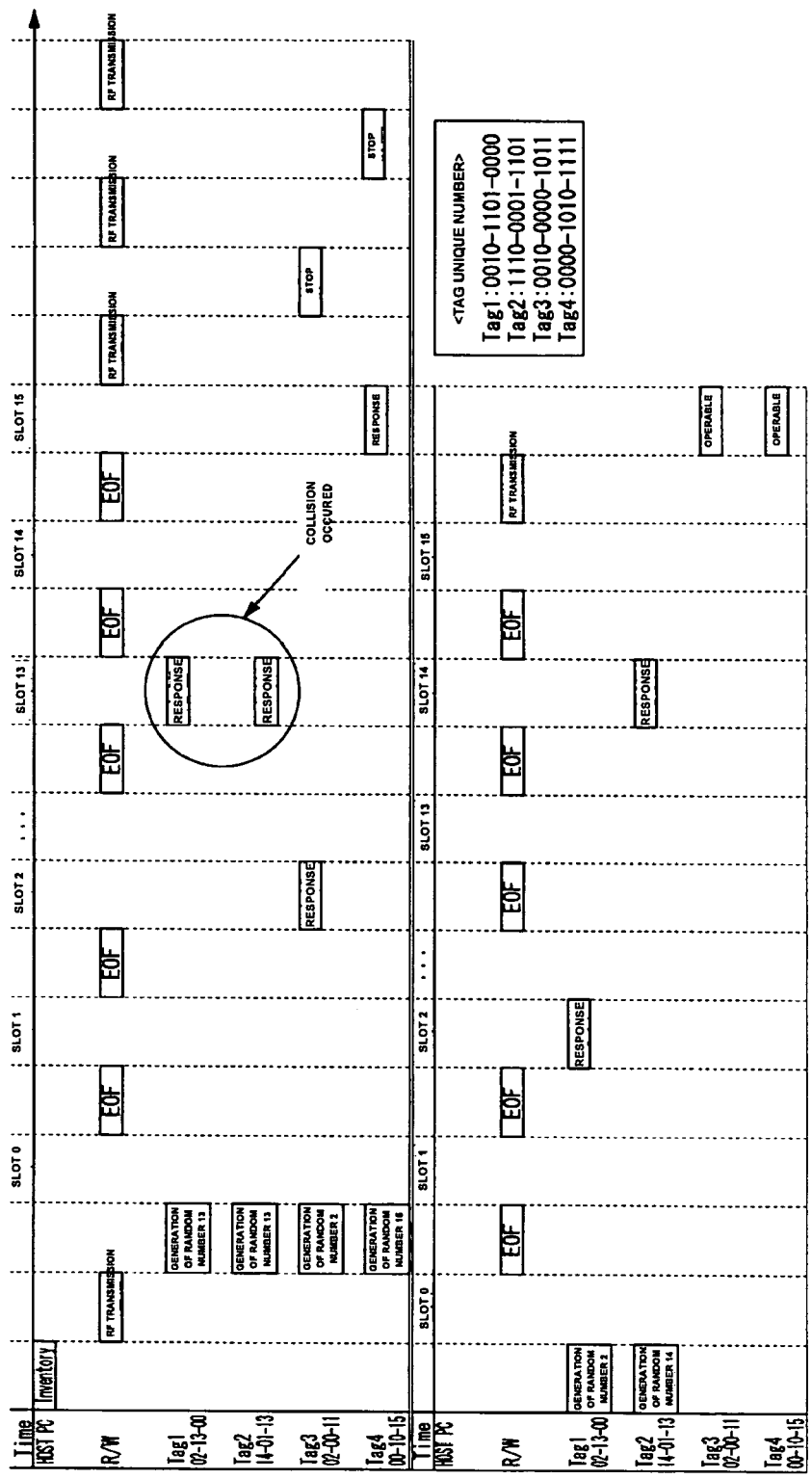
FIG. 9 is a time chart indicating process flows of respective devices at a time of setting time slot numbers in a data communication system in accordance with a second embodiment of the invention.

FIG. 9 is a time chart indicating the process flows of the respective devices at the time of setting time slot numbers in the data communication system 1. Here, although not particularly shown in the figure, it is assumed that four (first through fourth) contactless identification tags 4A–4D (Tag 1-Tag 4 in FIG. 9, respectively) are present in the range of communication of the reader/writer device 3.

Also, as a unique identification number (UID), "0010-1101-0000" is set in the first contactless identification tag 4A, "1110-0001-1101" is set in the second contactless identification tag 4B, "0010-0000-1011" is set in the third contactless identification tag 4C, and "0000-1010-1111" is set in the fourth contactless identification tag 4D, respectively. Here, the identification number is divided by "–" signs into three blocks, each having a bit string of four digits as one block.

First, the host device 2 transmits to the reader/writer device 3 a command ("Inventory" command indicated in FIG. 5) to have the first-fourth contactless identification tags 4A-4D set time slot numbers. Upon receiving the "Inventory" command, the reader/writer device 3 transmits a command equivalent to the "Inventory" command to set time slot numbers in an analyzable format to the first-fourth contactless identification tags 4A–4D that are present in the range of communication.

When the first-fourth contactless identification tags 4A-4D receive the command to set time slot numbers transmitted from the reader/writer device 3, initially, each of the driving electric power generation sections 4e generates a driving electric power from the carrier wave of the signal received and supplies the same to each of the sections that compose each of the contactless identification tags 4. When the driving electric power is supplied, the data control section 4c first clears a first time slot counter of its own (not shown) to 0, then generates a random number (here, in a range of numerical values of 0-2), and sets a time slot number based on the random number and the identification number described above.

Here, a random number "1" is generated in the first contactless identification tag 4A, and a time slot number "1101(13)" (here, the numerical value in parentheses is a decimal number) is set based on the random number and the identification number "0010-1101-0000." In other words, random numbers "0", "1" and "2" sequentially correspond from the left to the blocks of the identification number that is divided into three blocks. Similarly, a random number "2" is generated in the second contactless identification tag 4B, and a time slot number "1101(13)" (here, the numerical value in parentheses is a decimal number) is set based on the random number and the identification number "1110-0001-1101."

Further, a random number "0" is generated in the third contactless identification tag 4C, and a time slot number "0010(2)" (here, the numerical value in parentheses is a decimal number) is set based on the random number and the identification number "0010-0000-1011." Moreover, a random number "2" is generated in the fourth contactless identification tag 4D, and a time slot number "1111(15)" (here, the numerical value in parentheses is a decimal number) is set based on the random number and the identification number "0000-1010-1111."

Next, after transmitting the command to set time slot numbers, the reader/writer device 3 clears a second time slot counter of its own (not shown) to "0," and transmits a EOF command to the first-fourth contactless identification tags 4A-4D. Upon receiving the EOF command, each of the first-fourth contactless identification tags 4A-4D compares the value "0" of the first time slot counter with the time slot number that is set on its own. Here, none of the tags is set at the time slot number 0, and therefore the first-fourth contactless identification tags 4A-4D do not return a response, and increment the value at the first time slot counter by one.

When the reader/writer device 3 receives a response or affirms that there is no response during a predetermined time from the contactless identification tags 4, the reader/writer device 3 transmits again an EOF command to the first-fourth contactless identification tags 4A-4D. At this time, each time an EOF is transmitted, the reader/writer device 3 also increments the second time slot counter by one. In this manner, each time the second time slot counter is incremented by one, an EOF command is transmitted to the first-fourth contactless identification tags 4A-4D until the value of this time slot counter becomes 15.

As shown in FIG. 9, first, information including the identification number described above is transmitted from the third contactless identification tag 4C as a response, in response to an EOF command corresponding to a value 2 of the first time slot counter. Then, next, responses are transmitted from the first contactless identification tag 4A and the second contactless identification tag 4B, respectively, in response to an EOF command corresponding to a value 13 of the first time slot counter. This means that the same time slot numbers are set at the first contactless identification tag 4A and the second contactless identification tag 4B, and the reader/writer device 3 receives the signal in an abnormal state (for example, in a state in which signal waveforms corresponding to 1 and 0 when Manchester codes are used are overlapped one another), and thus detects a collision state. The reader/writer device 3 memorizes an event of the collision.

Further, a response is transmitted from the fourth contactless identification tag 4D, in response to an EOF command corresponding to a value 15 of the first time slot counter. By this, the processing to send EOF commands corresponding to values 0-15 of the second time slot counter is completed.

Next, the reader/writer device 3 judges, based on the information including the identification numbers of the third and fourth contactless identification tags 4C and 4D and the information on the event of the collision stored in the data storage section 3e, that a collision occurred in those of the contactless identification tags 4 other than the contactless identification tags 4C and 4D that are present in the range of communication, and transmits a command for suspending operations to the third and fourth contactless identification tags 4C and 4D. In other words, the transmission of the operation suspension command is not performed in response to the "Stay_Quiet" command received from the host device 2, but in response to the judgment with the event of a collision made by the data control section 3c.

As shown in FIG. 9, the reader/writer device 3 sequentially transmits a command for suspending operations equivalent to the "Stay_Quiet" command to the third and fourth contactless identification tags 4C and 4D which returned normal responses, in this order, in a format that can be analyzed by the third and fourth contactless identification tags 4C and 4D. As a result, the third and fourth contactless identification tags 4C and 4D are placed in a state in which their operations are suspended to commands other than a command to restart the operations from the reader/writer device 3. It is noted here that, since the identification numbers of the third and fourth contactless identification tags 4C and 4D are known, commands can be transmitted to them individually.

Next, as shown in FIG. 9, the reader/writer device 3 transmits a command equivalent to the "Inventory" command to the first-fourth contactless identification tags 4A-4D that are present in the range of communication. Here, the third and fourth contactless identification tag 4C and 4D do not perform the time slot number setting process upon receiving the command to set time slot numbers because they are in the state in which their operation is suspended by the operation suspension command.

In the meantime, upon receiving the command to set time slot numbers from the reader/writer device 3, each of the first and second contactless identification tags 4A and 4B clears the first time slot counter to 0, generates a random number (here, in the range of numerical values of 0–2), and sets a time slot number based on the random number and the identification number described above, in a manner similar to the above. Here, "0010(2)" is set to the first contactless identification tag 4A as a time slot number, and "1110(14)" is set to the second contactless identification tag 4B as a time slot number.

Therefore, a response is transmitted from the first contactless identification tag 4A in response to the EOF command corresponding to a counter value 2 of the first time slot counter, and further, a response is transmitted from the second contactless identification tag 4B in response to the EOF command corresponding to a counter value 14 of the first time slot counter, which are received by the reader/writer device 3, respectively. As a result, the reader/writer device 3 acquires each of the identification numbers of the first-fourth contactless identification tags 4A-4D in the range of communication.

The reader/writer device 3, after acquiring tag information of all the contactless identification tags 4 in its range of communication, transmits a command for restarting operations equivalent to the "Reset to ready" command to the third and fourth contactless identification tags 4C and 4D that are in the state in which their operations are suspended, in an analyzable format. As a result, upon receiving the command for restarting operations, the third and fourth contactless identification tags 4C and 4D restart their respective operations that are suspended. Then, the reader/writer device 3 transmits to the host device 3 tag information including identification numbers of all the contactless identification tags 4 that are present in its range of communication. Accordingly, the host device 2 thereafter can transmit commands, etc. to specific ones of the contactless identification tags 4 in the range of communication of the reader/writer device 3, by using the acquired identification numbers.

Figure 10:
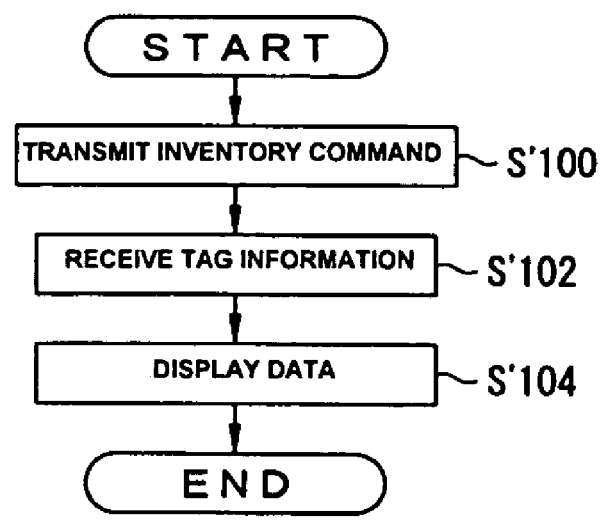
FIG. 10 is a flow chart that shows operation processing of a host device that takes place when a time slot number setting process and a tag information transmission process are performed in accordance with a second embodiment of the invention.

Further, referring to FIG. 10, the flow of operation processing of the host device 2, which takes place when the time slot number setting process and the tag information transmission process are performed, is described. FIG. 10 is a flow chart that shows the operation processing of the host device 2 which takes place when the time slot number setting process and the tag information transmission process are performed. As shown in FIG. 10, first, the process proceeds to step S'100, where the "Inventory" command described above is transmitted to the reader/writer device 3 by the data control section 2a and the data communication section 2b, and the process proceeds to step S'102. Here, the AFI information described above is appended to the "Inventory" command.

In step S'102, tag information including the identification numbers of the contactless identification tags 4 is received from the reader/writer device 3 by the data control section 2a and the data communication section 2b. Then, the received tag information including the identification numbers is stored in the data storage section 2d by the data control section 2a. Then, the process proceeds to step S'104. In step S'104, the received tag information including the identification numbers is displayed by the data control section 2a and the display section 2c, and the process ends. The operation processing shown in FIG. 10 has a fewer number of processing steps, and easier than the operation processing shown in FIG. 6.

Figure 11:
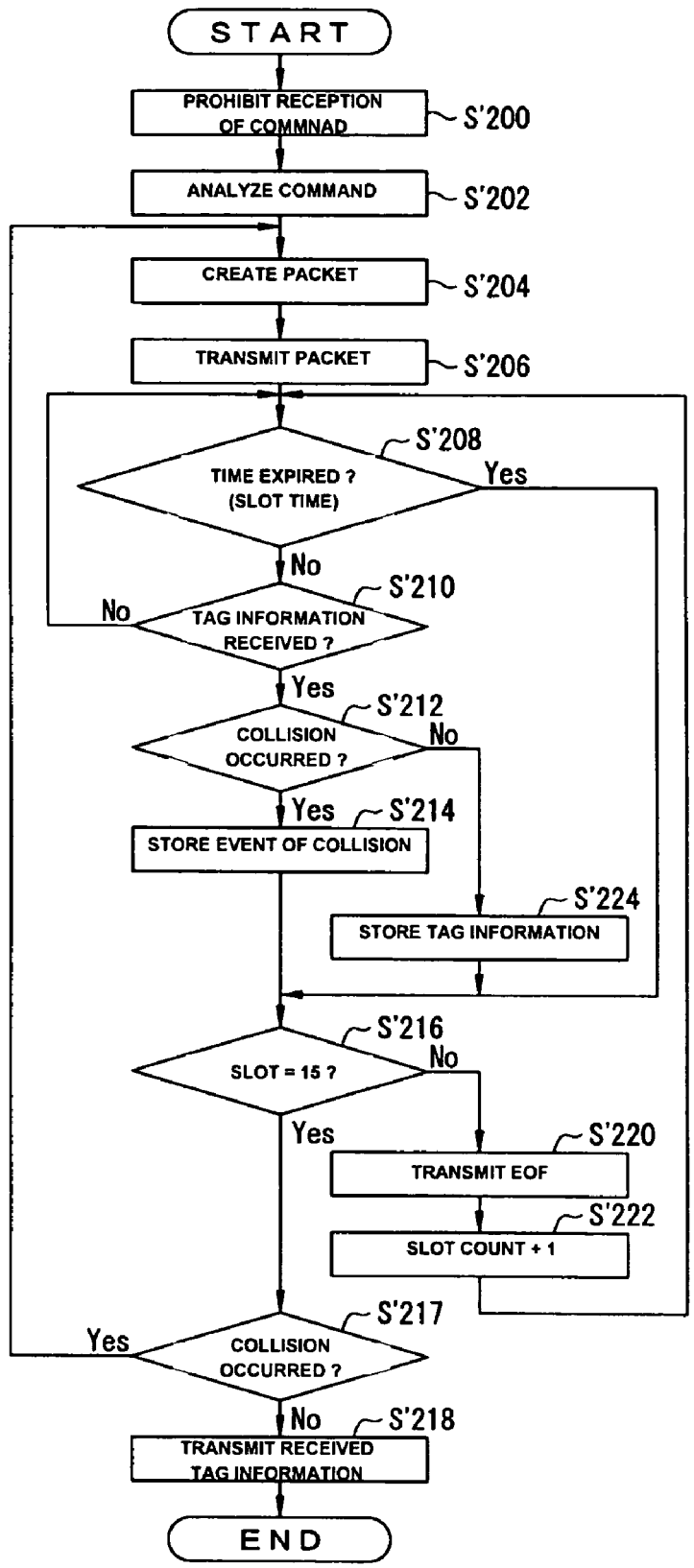
FIG. 11 is a flow chart that shows operation processing of a reader/writer device that takes place when a time slot number setting process and a tag information transmission process are performed in accordance with a second embodiment of the invention.

Further, referring to FIG. 11, the flow of operation processing of the reader/writer device 3, which takes place when the time slot number setting process and the tag information transmission process are performed, is described. FIG. 11 is a flow chart indicating the operation processing of the reader/writer device 3 which takes place when the time slot number setting process and the tag information transmission process are performed. Here, the present flow chart begins with the processing after the "Inventory" command is received from the host device 2.

As shown in FIG. 11, first, the process proceeds to step S'200, where the data control section 3c prohibits reception of commands from the host device 2, and the process proceeds to step S'202. In other words, before the processing of the "Inventory" command ends, the process causes a state in which other commands are not received from the host device 2. In step S'202, the received "Inventory" command is analyzed by the data control section 3c, and the process proceeds to step S'204. In this analysis processing, AFI information and the like included in the "Inventory" command are extracted.

In step S'204, the data control section 3c generates a packet including a command (including AFI information) equivalent to the above-described "Inventory" command, which can be analyzed by the contactless identification tags 4, and the process proceeds to step S'206. In the present embodiment, a packet that includes the actual "Inventory" command is created. In step S'206, the generated packet described above is transmitted to the contactless identification tags 4 within the range of communication by the data control section 3c and the data transmission section 3b, and the process proceeds to step S'208. In step S'208, the data control section 3c judges whether a predetermined time has passed since the above-described packet was transmitted and became expired, and the process proceeds to step S'216 when it is judged that the prescribed time has expired (Yes), and proceeds to step S'210 if not (No).

When the process proceeds to step S'210, the data control unit 3c judges whether the tag information has been received from the contactless identification tags 4, and the process proceeds to step S'212 if it is judged to have been received (Yes), and proceeds to step S'208 if not (No). When the process proceeds to step S'212, the data control section 3c judges based on the received tag information as to whether a collision occurred, and the process proceeds to step S'214 if it is judged that a collision occurred (Yes), and proceeds to step S'224 if not (No). When the process proceeds to step S'214, the data control section 3c stores the event of the collision in the data storage section 3e, and the process proceeds to step S'216.

In step S'216, the data control section 3c judges whether the counter value of the second time slot counter became 15, and the process proceeds to step S'217 when it is judged that the value became 15 (Yes), and proceeds to step S'220 if not (No). When the process proceeds to step S'220, an EOF command is transmitted to the contactless identification tags 4 within the range of communication by the data control section 3c and the data transmission section 3b, and the process proceeds to step S'222. In step S'222, the data control section 3c increments the value of the second time slot counter by one, and the process proceeds to step S'208. When the process proceeds to step S'224, the data storage section 3e stores the received tag information described above in the data control section 3c, and the process proceeds to step S'216.

In the meantime, when the process proceeds to step S'217, the data control section 3c judges whether information on occurrence of a collision is stored in the data storage section 3e. If the information on occurrence of a collision is stored, and the collision has not been cancelled (Yes), the process proceeds to step S'204. In step S'204, a packet including a command for suspending operations is generated for those of the contactless identification tags with normal responses. Moreover, a packet including a command for setting time slot numbers is generated for those of the contactless identification tags whose collision has not been cancelled. In other words, the packet generating process in step S'204, when the process has proceeded from step S'217, is conducted for those of the contactless identification tags whose collision has not been cancelled to reset their time slot numbers.

In the meantime, when it is judged in step S'217 that information on occurrence of a collision is not stored, or when information on occurrence of a collision is stored, but the collision has already been canceled through the processing from step S'217 to step S'204 conducted once, or two or more times (No), the process proceeds to step S'218. When the process proceeds to step S'218, tag information including all the identification numbers is transmitted to the host device 2 by the data control section 3*c* and the data transmission section 3*b*, and the process ends. The tag information including the identification numbers transmitted to the host device 2 in step S'218 is displayed on, for example, the display section 2*c* of the host device 2.

In the second embodiment, the flow of operation processing of the contactless identification tag 4 when the time slot number setting process and the tag information transmission process are conducted is the same as the details explained with reference to FIG. 8 in the first embodiment. Accordingly, the description of the operation processing of the contactless identification tag 4 in accordance with the second embodiment is omitted.

In this manner, in accordance with the second embodiment, the contactless identification tag 4 performs a time slot number setting process that does not depend only on the event probability of the random number generation device, just as does the first embodiment, and therefore a time slot number setting process that is difficult to duplicate numbers among the plural contactless identification tags 4 can be performed. Furthermore, since tag information including the identification numbers of the contactless identification tags is obtained, the contactless identification tags 4 other than those with duplicate time slot numbers can be excluded from those that are subject to the resetting instruction.

Also, in accordance with the second embodiment, even when time slot numbers are duplicate, the reader/writer device 3 does not need to transmit information on occurrence of the collision to the host device 2, in contrast with the first embodiment. Also, there is no need to transmit an "Inventory" command to reset time slot numbers from the host device 2 to the reader/writer device 3. Accordingly, the communication time between the host device 2 and the reader/writer device 3 can be shortened.

Further, in accordance with the second embodiment, in step S'218 in FIG. 11, the event history of collisions may be included in tag information to be transmitted to the host device 2. With such a structure, a person who designs contactless identification tags can review random number generation algorithm, the method for setting unique identification numbers and the like based on the frequency (high or low) of collisions.

In accordance with the second embodiment, referring to FIG. 2, the processing to transmit the "Inventory" command to the reader/writer device 3 by the data control section 2*a* and the data communication section 2*b* corresponds to the first slot number setting instruction means of Invention 8, and the processing to receive tag information by the data control section 2*a* and the data communication section 2*b* corresponds to the first tag information obtaining means of Invention 8. The processing to display the tag information by the data control section 2*a* and the display section 2*c* corresponds to the tag information display means of Invention 10.

Also, referring to FIG. 3, the processing to transmit a command equivalent to the "Inventory" command to the contactless identification tags 4 by the data control section 3*c* and the data transmission section 3*b* corresponds to the second slot number setting instruction means of Invention 8, and the processing by the data control section 3*c* to detect the presence of contactless identification tags that have duplicate slot numbers corresponds to the duplication tag detection means of Invention 8. Furthermore, the processing to transmit a command equivalent to the "Inventory" command to the contactless identification tags 4 repeated by the data control section 3*c* and the data transmission section 3*b* after detecting the contactless identification tags 4 that have duplicate time slot numbers corresponds to the reset instruction means of Invention 8, and the processing to acquire tag information (including information on the collision) by the data control section 3*c* and the data reception section 3*a* corresponds to the second tag information obtaining means of Invention 8. Also, the processing to transmit tag information to the host device 2 by the data control section 3*c* and the data communication section 3*d* corresponds to the first tag information transmission means of Invention 8, and the processing to transmit an operation suspension command by the data control section 3*c* and the data transmission section 3*b* to the contactless identification tags 4 corresponds to the operation suspension instruction means of Invention 11. The processing to transmit an operation restart command by the data control section 3*c* and the data transmission section 3*b* to the contactless identification tags 4 corresponds to the operation restart instruction means of Invention 11.

Also, referring to FIG. 4, the processing to generate a random number by the data control section 4*c* corresponds to the random number generation means of any one of Inventions 1-6, the processing to set a time slot number by the data control section 4*c* corresponds to the time slot number setting means of any of Inventions 1-4, the processing to set a time slot number by the data control unit 4*c* for a command equivalent to the "Inventory" command repeated from the reader/writer device 3 corresponds to the slot number resetting means of Invention 8, and the processing to transmit tag information to the reader/writer device 3 by the data control section 4*c* and the data transmission section 4*b* corresponds to the second tag information transmission means of Invention 8.

In accordance with the present embodiments, in step S200 of FIG. 7 and step S'200 of FIG. 11, the reception of commands from the host device 2 is prohibited by the data control section 3*c*. However, the programs for controlling various sections stored in the data storage section 3*e* of the reader/writer device 3 may be modified, step S200 indicated in FIG. 7 and step S'200 indicated in FIG. 11 may be deleted, and the structure may be made such that interrupts of commands from the host device 2 to the reader/writer device 3 may be made possible. With such a structure, for example, when there is an interrupt of a command, the reader/writer device 3 can interrupt an anti-collision process (collision preventive process) indicated in FIG. 5 and FIG. 9, and automatically restart the interrupted anti-collision process after the interrupt of the command is completed. Accordingly, flexibility can be given to the data communication system that is composed of the host device 2, the reader/writer device 3, and the plural contactless identification tags 4.

The invention claimed is:

1. A contactless identification tag that sets a time slot number concerning a sequence of communications with a reader/writer device at the time of data communications with the reader/writer device by a time-division multiplex method using a plurality of time slots, and is capable of radio communications in a contactless manner with the reader/writer device according to a sequence of communications that is decided based on the time slot number that has been set, the contactless identification tag comprising:
   identification number storage means for storing a unique identification number;
   random number generator means for generating a random number; and
   time slot number setting means for setting the time slot number based on the identification number and the random number,
   wherein the random number and a bit position in a bit string indicating the identification number are correlated with each other in advance, and
   wherein the time slot number setting means extracts a numerical value at the bit position corresponding to the random number from the bit string indicating the identification number, and sets the time slot number based on the extracted numerical value.

2. A contactless identification tag as claimed in claim 1, wherein:
   the bit string indicating the identification number is divided into a plurality of blocks in units of a predetermined number of bits, and a different number is appended to each of the blocks; and
   the time slot number setting means selects one of the blocks corresponding to a random number generated by the random number generator means, and sets the time slot number based on a numerical value composed of a bit string included in the selected block.

3. A contactless identification tag as claimed in claim 1, wherein the time slot number setting means selects a specified bit from the bit string indicating the identification number based on a random number generated by the random number generator means, and sets the time slot number based on a numerical value composed of a bit string of a predetermined number of upper or lower bits with the selected bit as a reference position.

4. A data communication system equipped with a plurality of contactless identification tags as claimed in claim 1, a reader/writer device, and a host device, wherein:
   the reader/writer device, in response to an instruction from the host device, makes the plurality of contactless identification tags to set the time slot numbers so as not to duplicate one another, and
   radio data communications are performed in a contactless manner between the plurality of contactless identification tags and the reader/writer device based on the time slot numbers that have been set.

5. A contactless identification tag control program executable by a computer for controlling a contactless identification tag in a data communication system as claimed in claim 4, the program comprising a slot number resetting step of performing a processing to reset the time slot number in response to the instruction to reset time slot numbers from the reader/writer device.

6. A contactless identification tag control program as claimed in claim 5, comprising a second tag information transmission step of transmitting tag information to the reader/writer device.

7. A contactless identification tag control program as claimed in claim 5, comprising a step of stopping an operation in response to an operation suspension instruction from the reader/writer device, and a step of restarting the operation in response to an operation restart instruction from the reader/writer device.

8. A data communication system equipped with a plurality of contactless identification tags as claimed in claim 1, a reader/writer device, and a host device, wherein
   the host device comprises:
      first slot number setting instruction means for instructing the reader/writer device to have the plurality of contactless identification tags set the time slot numbers;
      first tag information obtaining means for obtaining tag information including the identification numbers of the contactless identification tags from the reader/writer device;
      duplication information obtaining means for obtaining, when duplication information of the time slot numbers is sent from the reader/writer device, the duplication information; and
      first reset instruction means for giving, when the duplication information is obtained by the duplication information obtaining means, an instruction to reset time slot numbers to the contactless identification tags with the time slot numbers being duplicate;
   the reader/writer device comprises:
      second slot number setting instruction means for giving, in response to the instruction to set time slot numbers from the host device, an instruction to set time slot numbers to the plurality of contactless identification tags;
      second reset instruction means for giving, in response to the instruction to reset time slot numbers from the host device, an instruction to reset time slot numbers to the contactless identification tags with the duplication information detected;
      second tag information obtaining means for obtaining tag information including the identification numbers of the contactless identification tags from the contactless identification tags;
      first tag information transmission means for transmitting to the host device the tag information obtained by the second tag information obtaining means;
      duplicate tag detection means for detecting, based on the tag information obtained by the second tag information obtaining means, whether any of the plurality of contactless identification tags have the time slot numbers being duplicate; and
      duplication information transmission means for transmitting to the host device the duplication information when the duplicate tag detection means detects that some of the contactless identification tags have the time slot numbers being duplicate; and
   each of the contactless identification tags comprises:
      slot number resetting means for performing, in response to the instruction to set time slot numbers from the reader/writer device, a processing to set the time slot number, and performing, in response to the instruction to reset time slot numbers from the reader/writer device, a processing to reset the time slot number; and
      second tag information transmission means for transmitting the tag information to the reader/writer device.

9. A data communication system as claimed in claim 8, wherein:

the host device is equipped with first operation suspension instruction means for giving an instruction to the contactless identification tags to suspend an operation thereof, and first operation restart instruction means for giving an instruction to the contactless identification tags whose operation is suspended by the first operation suspension instruction means to restart the operation; and the reader/writer device is equipped with second operation suspension instruction means for giving, in response to the instruction to suspend operations from the host device, an instruction to the contactless identification tags to suspend an operation thereof, and second operation restart instruction means for giving, in response to the instruction to restart operations from the host device, an instruction to the contactless identification tags whose operation is suspended to restart the operation thereof; and wherein each of the contactless identification tags suspends an operation thereof in response to the instruction to suspend operations from the reader/writer device, and restarts the operation that is suspended in response to the instruction to restart operations from the reader/writer device.

10. A data communication system as claimed in claim 8, wherein the host device is equipped with tag information display means for displaying the tag information obtained from the reader/writer device.

11. A reader/writer device control program executable by a computer for controlling a reader/writer device in a data communication system as claimed in claim 8, the program comprising:

a step of giving, in response to the instruction to set time slot numbers from the host device, an instruction to set time slot numbers to the plurality of contactless identification tags;

a step of giving, in response to an instruction to reset the time slot numbers from the host device, an instruction to reset time slot numbers to the plurality of contactless identification tags with the duplication detected;

a step of obtaining tag information including the identification numbers of the contactless identification tags from the contactless identification tags;

a step of transmitting to the host device the tag information obtained by the second tag information obtaining means;

a step of detecting, based on the tag information obtained by the second tag information obtaining means, whether any of the plurality of contactless identification tags have the time slot numbers that are duplicate; and a step of transmitting to the host device the duplication information when the duplicate tag detection means detects that some of the contactless identification tags have the time slot numbers that are duplicate.

12. A data communication system equipped with a plurality of contactless identification tags as claimed in claim 1, a reader/writer device, and a host device, wherein the host device comprises:

first slot number setting instruction means for instructing the reader/writer device to have the plurality of contactless identification tags set the time slot numbers; and first tag information obtaining means for obtaining tag information including the identification numbers of the contactless identification tags from the reader/writer device;

the reader/writer device comprises:

second slot number setting instruction means for giving, in response to the instruction from the host device, an instruction to set time slot numbers to the plurality of contactless identification tags;

second tag information obtaining means for obtaining tag information including the identification numbers of the contactless identification tags from the contactless identification tags;

duplicate tag detection means for detecting, based on the tag information obtained by the second tag information obtaining means, whether any of the plurality of contactless identification tags have the time slot numbers being duplicate;

reset instruction means for giving, when the duplicate tag detection means detects that some of the contactless identification tags have the time slot numbers being duplicate, an instruction to reset time slot numbers to the contactless identification tags; and first tag information transmission means for transmitting to the host device the tag information obtained by the second tag information obtaining means; and each of the contactless identification tags comprises:

slot number resetting means for performing, in response to the instruction to set time slot numbers from the reader/writer device, a processing to set the time slot number, and performing, in response to the instruction to reset time slot numbers from the reader/writer device, a processing to reset the time slot number; and second tag information transmission means for transmitting the tag information to the reader/writer device.

13. A data communication system as claimed in claim 12, wherein the tag information includes information indicating that the time slot numbers are duplicate.

14. A data communication system as claimed in claim 12, wherein:

the reader/writer device is equipped with operation suspension instruction means for giving an instruction to the contactless identification tags to suspend operations thereof, and operation restart instruction means for giving an instruction to the contactless identification tags whose operation is suspended by the operation suspension instruction means to restart the operation thereof;

each of the contactless identification tags suspends an operation thereof in response to the instruction to suspend operations from the reader/writer device, and restarts the operation that is suspended in response to the instruction to restart operations from the reader/writer device; and the reader/writer device gives, when the duplicate tag detection means detects that some of the contactless identification tags have the time slot numbers being duplicate, an instruction to the contactless identification tags having the time slot numbers that are not duplicate to have the operation suspension instruction means suspend the operation thereof, and gives, when duplication of the time slot numbers is cancelled by the resetting instruction means, an instruction to the contactless identification tags whose operation is suspended, to have the operation restart instruction means restart the operation.

15. A reader/writer device control program executable by a computer for controlling a reader/writer device in a data communication system as claimed in claim 12, the program comprising:
- a step of giving, in response to the instruction from the host device, an instruction to set time slot numbers to the plurality of contactless identification tags;
- a step of obtaining tag information including the identification numbers of the contactless identification tags from the contactless identification tags;
- a step of detecting, based on the tag information obtained by the second tag information obtaining means, whether any of the plurality of contactless identification tags have the time slot numbers that are duplicate;
- a step of giving, when the duplicate tag detection means detects that some of the contactless identification tags have the time slot numbers that are duplicate, an instruction to reset time slot numbers to the contactless identification tags, and
- a step of transmitting to the host device the tag information obtained by the second tag information obtaining means.

16. A contactless identification tag control program executable by a computer for controlling a contactless identification as claimed in claim 1, the program comprising:
- a random number generating step of generating a random number; and
- a slot number setting step of setting the time slot number based on the identification number stored in the identification number storage means and the random number generated in the random number generating step, wherein the random number and a bit position in a bit string indicating the identification number are correlated with each other in advance, and wherein the time slot number setting step includes extracting a numerical value at the bit position corresponding to the random number from the bit string indicating the identification number, and setting the time slot number based on the extracted numerical value.

17. A contactless identification tag program as claimed in claim 16, wherein:
- the bit string indicating the identification number is divided into a plurality of blocks in units of a predetermined number of bits, and a different number is appended to each of the blocks; and
- the time slot number setting step includes selecting one of the blocks corresponding to a random number generated by the random number generating step, and setting the time slot number based on a numerical value composed of a bit string included in the selected block.

18. A contactless identification tag program as claimed in claim 16, wherein the time slot number setting step includes selecting a specified bit from the bit string indicating the identification number based on a random number generated by the random number generating step, and setting the time slot number based on a numerical value composed of a bit string of a predetermined number of upper or lower bits with the selected bit as a reference position.

* * * * *